(12) United States Patent
Wang et al.

(10) Patent No.: US 11,847,812 B2
(45) Date of Patent: Dec. 19, 2023

(54) IMAGE GENERATION METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Liang Wang, Shenzhen (CN); Jiarui Sun, Shenzhen (CN); Yanchun Zhu, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/684,608

(22) Filed: Mar. 2, 2022

(65) Prior Publication Data

US 2022/0189136 A1    Jun. 16, 2022

Related U.S. Application Data

(63) Continuation of application No. PCT/CN2020/127065, filed on Nov. 6, 2020.

(30) Foreign Application Priority Data

Feb. 17, 2020  (CN) .......................... 202010097623.0

(51) Int. Cl.
    *G06V 10/44*    (2022.01)
    *G06V 10/46*    (2022.01)

(52) U.S. Cl.
    CPC .............. *G06V 10/44* (2022.01); *G06V 10/46* (2022.01)

(58) Field of Classification Search
    USPC .......................................... 382/103, 128, 133
    See application file for complete search history.

(56) References Cited

U.S. PATENT DOCUMENTS

2022/0076410 A1* 3/2022 Georgescu ............... G06N 3/08

FOREIGN PATENT DOCUMENTS

| CN | 105335976 A | 2/2016 |
|---|---|---|
| CN | 106407902 A | 2/2017 |

(Continued)

OTHER PUBLICATIONS

Extended European Search Report dated Nov. 24, 2022 in European Application No. 20919715.1.

(Continued)

*Primary Examiner* — Ishrat I Sherali
(74) *Attorney, Agent, or Firm* — Sughrue Mion, PLLC

(57) ABSTRACT

An image generation method, apparatus, device, and storage medium. The method includes: obtaining contour information and target region information; determining at least one target contour according to the contour information and the target region information, the at least one target contour wholly or partly located in a target region; decreasing first coordinates of a plurality of contour points in the at least one target contour to obtain second location information, second location information of the at least one target contour includes second coordinates of a plurality of contour points in the at least one target contour, and the first coordinates of the plurality of contour points in the at least one target contour having a same decreasing extent; and generating a target image corresponding to the target region according to the second location information of the at least one target contour and the target region information.

20 Claims, 12 Drawing Sheets

(56) References Cited

FOREIGN PATENT DOCUMENTS

| CN | 107563384 A | | 1/2018 | |
|----|-------------|---|--------|---|
| CN | 109378052 A | | 2/2019 | |
| CN | 110739051 A | * | 1/2020 | ............ G06N 3/045 |
| CN | 110739051 A | | 1/2020 | |
| CN | 111325220 A | | 6/2020 | |
| WO | 2014/102428 A1 | | 7/2014 | |

OTHER PUBLICATIONS

International Search Report for PCT/CN2020/127065 dated Feb. 18, 2021 (PCT/ISA/210).
Written Opinion for PCT/CN2020/127065 dated Feb. 18, 2021 (PCT/ISA/237).

* cited by examiner

IMAGE GENERATION METHOD AND APPARATUS, DEVICE, AND STORAGE MEDIUM

CROSS-REFERENCE TO RELATED APPLICATION(S)

This application is a continuation application of International Application No. PCT/CN2020/127065, filed on Nov. 6, 2020, which claims priority to Chinese Patent Application No. 202010097623.0, filed with the China National Intellectual Property Administration on Feb. 17, 2020, the disclosures of which are incorporated by reference in their entireties.

FIELD

The present disclosure relates to the field of computer technologies, and in particular, to an image generation method, a device, and a storage medium.

BACKGROUND

At present, the processing of whole slide images (WSIs) is increasingly based on deep learning network models. For example, before a target object in a WSI is recognized, a network model needs to be trained by using the WSI and a target image of the WSI, where the target image is an image generated according to location information of a contour in the WSI. Since the size of the target image is relatively large and exceeds the processing range of the current image generation technology, it is necessary to reduce the size of the target image.

In the related art, the location information of the contour in the WSI is reduced, and the target image of the WSI is generated according to the reduced location information. However, if there are two contours in the WSI that are relatively close, after the location information is reduced, the two contours may overlap. Consequently, in the generated target image, the two contours are connected to become one contour, thereby obtaining a wrong target image.

SUMMARY

Embodiments of the disclosure provide an image generation method and an apparatus, a device, and a storage medium, which can improve the accuracy of a target image. The technical solutions are as follows:

According to an aspect, an image generation method may be provided, including: obtaining contour information and target region information, the contour information including first location information of at least one original contour in an original image, first location information of any original contour including first coordinates of a plurality of contour points in the any original contour, and the target region information indicating a target region in the original image; determining at least one target contour according to the contour information and the target region information, any target contour being wholly or partly located in the target region; decreasing first coordinates of a plurality of contour points in the at least one target contour to obtain second location information of the at least one target contour, second location information of any target contour including second coordinates of a plurality of contour points in the any target contour, and the first coordinates of the plurality of contour points in the at least one target contour having a same decreasing extent; and generating a target image corresponding to the target region according to the second location information of the at least one target contour and the target region information, the target image including a contour located in the target region.

According to another aspect, an image generation apparatus may be provided, including: an information obtaining module, configured to obtain contour information and target region information, the contour information including first location information of at least one original contour in an original image, first location information of any original contour including first coordinates of a plurality of contour points in the any original contour, and the target region information indicating a target region in the original image; a determining module, configured to determine at least one target contour according to the contour information and the target region information, any target contour being wholly or partly located in the target region; a decreasing module, configured to decrease first coordinates of a plurality of contour points in the at least one target contour to obtain second location information of the at least one target contour, second location information of any target contour including second coordinates of a plurality of contour points in the any target contour, and the first coordinates of the plurality of contour points in the at least one target contour having a same decreasing extent; and a generation module, configured to generate a target image corresponding to the target region according to the second location information of the at least one target contour and the target region information, the target image including a contour located in the target region.

In an example embodiment, the first coordinates include horizontal coordinates and vertical coordinates, and the apparatus may further include: an extent obtaining module, configured to: obtain a first minimum horizontal coordinate and a first minimum vertical coordinate according to first location information of the at least one target contour; determine the first minimum horizontal coordinate as a decreasing extent of horizontal coordinates of the plurality of contour points in the at least one target contour; and determine the first minimum vertical coordinate as a decreasing extent of vertical coordinates of the plurality of contour points in the at least one target contour.

In an example embodiment, the first coordinates include horizontal coordinates and vertical coordinates, and the extent obtaining module is further configured to: obtain a second minimum horizontal coordinate and a second minimum vertical coordinate of the target region according to the target region information; determine the second minimum horizontal coordinate as a decreasing extent of horizontal coordinates of the plurality of contour points in the at least one target contour; and determine the second minimum vertical coordinate as a decreasing extent of vertical coordinates of the plurality of contour points in the at least one target contour.

In an example embodiment, the determining module is further configured to determine, in response to determining that any contour point is located in the target region according to the contour information and the target region information, an original contour to which the any contour point belongs as a target contour.

In an example embodiment, the determining module may include: a reduction unit, configured to reduce the first location information of the at least one original contour to obtain third location information of at least one first contour, any first contour being a contour after a corresponding original contour is reduced, and the first location information of the at least one original contour having a same reduction ratio; a first generation unit, configured to generate a first image corresponding to the original image according to the third location information of the at least one first contour, the first image including the at least one first contour, the reduction unit being further configured to reduce the target region information to obtain first region information, the first region information indicating the reduced target region, and a reduction ratio of the target region information being equal to the reduction ratio of the first location information of the at least one original contour; and a first determining unit, configured to determine the at least one target contour according to the first region information and the first image.

In an example embodiment, the contour information may further include a contour identifier of the at least one original contour; and the first generation unit is configured to generate the first image according to the third location information of the at least one first contour and the contour identifier of the at least one original contour, the first image including the at least one first contour and a contour identifier of the at least one first contour, and a contour identifier of any first contour being a contour identifier of an original contour corresponding to the any first contour.

In an example embodiment, the first determining unit may be configured to: determine a contour identifier of at least one second contour according to the at least one first contour in the first image, the contour identifier of the at least one first contour, and the first region information, the at least one second contour being a first contour that is wholly or partly located in the reduced target region in the first image; and determine an original contour corresponding to the at least one second contour as a target contour according to the contour identifier of the at least one second contour.

In an example embodiment, the first generation unit is configured to set a pixel value in a contour region corresponding to any first contour as the contour identifier of the any first contour; and generate the first image according to the third location information of the at least one first contour and a pixel value in a contour region corresponding to the at least one first contour.

In an example embodiment, the generation module may include a second generation unit, configured to generate a third image according to the second location information of the at least one target contour, the third image including the at least one target contour; and a cutting unit, configured to cut the target region in the third image according to the target region information, to obtain the target image corresponding to the target region.

In an example embodiment, the generation module may include: a second determining unit, configured to determine contour points located in the target region in the at least one target contour according to second coordinates of the plurality of contour points in the at least one target contour and the target region information, the second generation unit being further configured to generate the target image according to second coordinates of the contour points located in the target region in the at least one target contour and the target region information.

According to another aspect of an embodiment, a computer device may be provided, including a processor and a memory, the memory storing at least one instruction, the at least one instruction being loaded and executed by the processor to implement the operations performed in the image generation method according to the foregoing aspect.

According to another aspect of an embodiment, a non-transitory computer-readable storage medium is provided, storing at least one instruction, the at least one instruction being loaded and executed by a processor to implement the operations performed in the image generation method according to the foregoing aspect.

According to another aspect of an embodiment, a computer program product is provided, storing at least one instruction, the at least one instruction being loaded and executed by a processor to implement the operations performed in the image generation method according to the foregoing aspect.

The technical solutions provided in the embodiments of the disclosure include at least the following beneficial effects:

According to the image generation method, the device, and the storage medium provided in the embodiments of the disclosure, the target region is defined, so that the computer device only needs to generate the target image corresponding to the target region, and does not need to generate images corresponding to other regions. According to the disclosure, the coordinates of the plurality of contour points on the target contour are decreased to achieve the effect of cutting off the images corresponding to other regions, thereby reducing the size of the target image. In addition, the coordinates of the plurality of contour points on the target contour in the disclosure have the same decreasing extent, to ensure that a distance between contours in the target image is the same as a distance between corresponding contours in the original image, thereby avoiding the problem of contour adhesion, and ensuring the accuracy of the generated target image.

In addition, the minimum horizontal coordinate in the at least one target contour may be used as the decreasing extent of the horizontal coordinated of each contour point in the at least one target contour, and the minimum vertical coordinate in the at least one target contour may be used as the decreasing extent of the vertical coordinate of each contour point in the at least one target contour, which is equivalent to using the minimum horizontal coordinate and the minimum vertical coordinate as the origin of the contour coordinate system of the target image, avoiding drawing the region outside the at least one target contour as much as possible, and reducing the size of the target image.

In addition, the minimum horizontal coordinate in the target region information may be used as the decreasing extent of the horizontal coordinated of each contour point in the at least one target contour, and the minimum vertical coordinate in the target region information may be used as the decreasing extent of the vertical coordinate of each contour point in the at least one target contour, which is equivalent to using the minimum horizontal coordinate and the minimum vertical coordinate in the target region information as the origin of the contour coordinate system of the target image, avoiding drawing the region outside the target region as much as possible, and reducing the size of the target image.

In addition, according to the disclosure, the first location information of at least one original contour is further reduced to generate the first image corresponding to the original image. The first image includes the contour identifier of at least one original contour. The first image may be regarded as an index image of the original image. At least one target contour located in the target region in the original image can be determined according to the target region information of the original image and the first image, which increases the speed of determining at least one target contour located in the target region, and also improves the efficiency of generating the target image.

BRIEF DESCRIPTION OF THE DRAWINGS

To describe the technical solutions in the embodiments of this disclosure more clearly, the accompanying drawings required for describing the embodiments are briefly described hereinafter. The accompanying drawings in the following descriptions show merely some embodiments of the disclosure, and a person of ordinary skill in the art may obtain other accompanying drawings according to these accompanying drawings without creative efforts. In addition, one of ordinary skill would understand that aspects of example embodiments may be combined together or implemented alone.

DESCRIPTION OF EMBODIMENTS

To make objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

It may be understood that the terms "first", "second", and the like used in the disclosure may be used for describing various concepts. However, the concepts are not limited by the terms unless otherwise specified. The terms are merely used for distinguishing one concept from another concept. For example, without departing from the scope of the disclosure, first coordinates may be referred to as second coordinates, and similarly, the second coordinates may be referred to as the first coordinates.

The term "at least one" used in the disclosure includes one or more, and a quantity of at least one is an integer. For example, the at least one is 1, 2, 3, or the like. The term "a plurality of" used in the disclosure includes two or more, and a quantity of the plurality is an integer. For example, the plurality is 2, 3, 4, or the like. The term "each" used in the disclosure refers to each of a plurality of corresponding ones. For example, a plurality of contour points are three contour points, and each of the plurality of contour points refers to each of the three contour points. The term "any" used in the disclosure does not require all, and instead refers to any one of a plurality of corresponding ones. For example, a plurality of contour points are three contour points, and any one of the plurality of contour points refers to any one of the three contour points. For example, any contour point is a first contour point, or a second contour point, or a third contour point.

An image generation method provided in embodiments of the disclosure is performed by a computer device. In a possible implementation, the computer device is a terminal such as a mobile phone, a computer, or a tablet computer. The terminal may obtain contour information and target region information, and determine at least one target contour according to the contour information and the target region information, any target contour being wholly or partly located in a target region; decrease first coordinates of a plurality of contour points in the at least one target contour to obtain second location information of the at least one target contour; and generate a target image corresponding to the target region according to the second location information of the at least one target contour and the target region information, the target image including a contour located in the target region.

Figure 1:
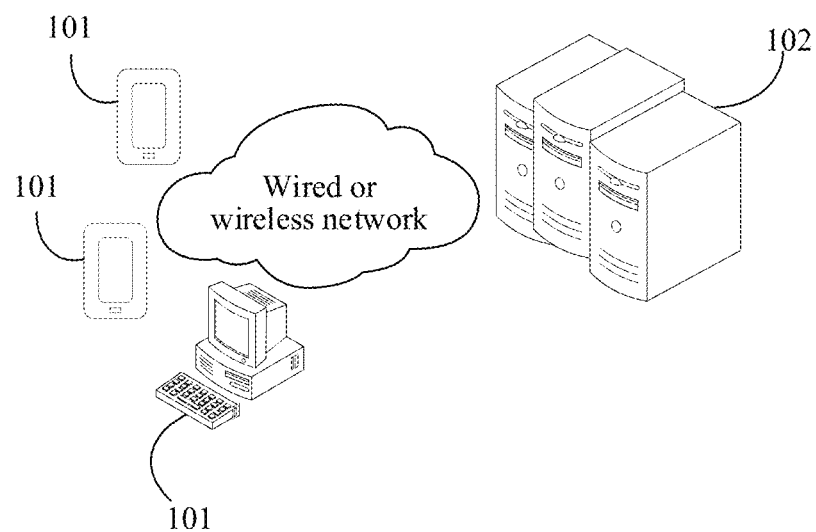
FIG. 1 is a schematic diagram of an implementation environment according to an embodiment of the disclosure.

In another example embodiment, the computer device is a server. The server is one server, a server cluster including a plurality of servers, or a cloud computing service center. FIG. 1 is a schematic diagram of an implementation environment according to an embodiment of the disclosure. Referring to FIG. 1, the implementation environment includes a terminal 101 and a server 102. The terminal 101 and the server 102 establish a communication connection through a wired or wireless network.

A target application may be installed on the terminal 101, and the target application is an application with an image processing function or an application related to image processing. The server 102 is a server that provides services for the target application.

In an example embodiment, the server 102 stores contour information, the user sends target region information to the server 102 through the target application of the terminal 101, and the server 102 obtains the target region information. The server 102 determines at least one target contour according to the contour information and the target region information, any target contour being wholly or partly located in a target region; decreases first coordinates of a plurality of contour points in the at least one target contour to obtain second location information of the at least one target contour; and generates a target image corresponding to the target region according to the second location information of the at least one target contour and the target region information, the target image including a contour located in the target region.

The method provided in this embodiment of the disclosure is applicable to an image generation scenario. For example, in a scenario of generating a target image of a WSI:

The WSI includes a target object, and a target image corresponding to the WSI includes a contour of the target object in the WSI. In some embodiments, the WSI and the target image corresponding to the WSI are used as training data of a network model, thereby training a network model that can recognize the target object in the WSI. By using the image generation method provided in the embodiments of the disclosure, coordinates of contour points of each target contour can be decreased, thereby reducing the size of the generated target image. In addition, a relative position of each contour point in the target image is not changed, that is, a relative position relationship between contours in the target image is the same as a relative position relationship between corresponding contours in the original image, thereby avoiding the problem that the two contours in the original image are connected, and ensuring the accuracy of the target image.

The image generation method provided in the embodiments of the disclosure is applicable to any scenario in which an image is generated, and this is not limited in the embodiments of the disclosure.

Figure 2:
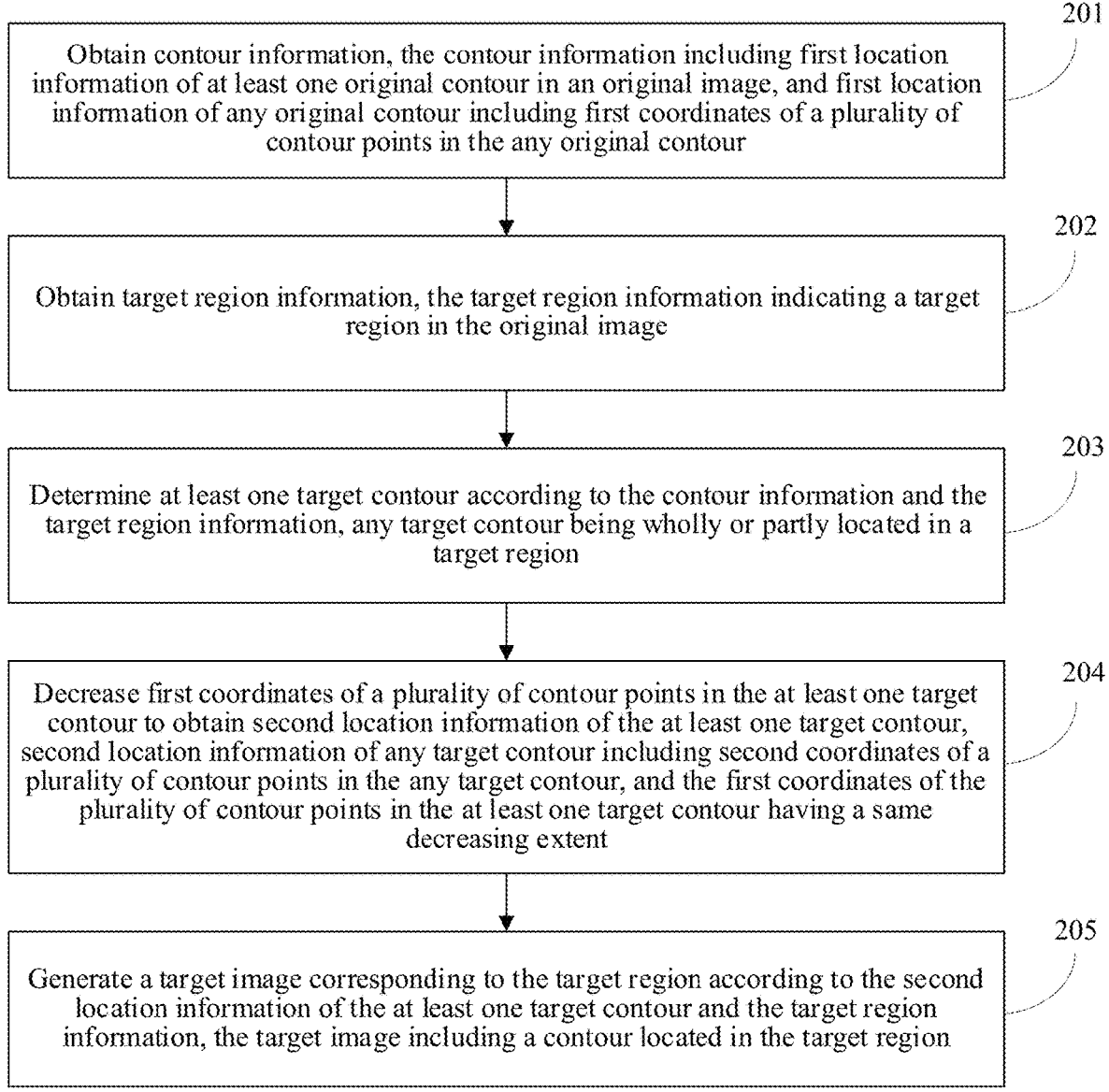
FIG. 2 is a flowchart of an image generation method according to an embodiment of the disclosure.

FIG. 2 is a flowchart of an image generation method according to an embodiment of the disclosure. The execution entity of the embodiments of the disclosure is a computer device. The computer device is a terminal such as a mobile phone, a computer, or a tablet computer, or a server, a server cluster including a plurality of servers, or a cloud computing service center. The image generation process is described in the embodiments of the disclosure. Referring to FIG. 2, the image generation method includes:

201: Obtain contour information, the contour information including first location information of at least one original contour in an original image, and first location information of any original contour including first coordinates of a plurality of contour points in the any original contour.

Figure 3:
FIG. 3 is a schematic diagram of an original image according to an embodiment of the disclosure.

The original image may be any image including a target object. An original contour in the original image is a contour of the target object in the original image. As shown in FIG. 3, the original image includes a plurality of target objects 301, and contours of the target objects 301 are original contours in the original image. In some embodiments, the target object is any object. For example, the original image is a pathological WSI, the target objects are cancerous cells, and the original contours are contours of the cancerous cells; or the target objects are a cell group of cancerous cells, the original contour is a contour of the cell group, and the cell group is a part including a plurality of cells.

In some embodiments, the at least one original contour refers to all original contours in the original image, or refers to a part of the original contours in the original contour. This is not limited in the embodiments of the disclosure.

Figure 4:
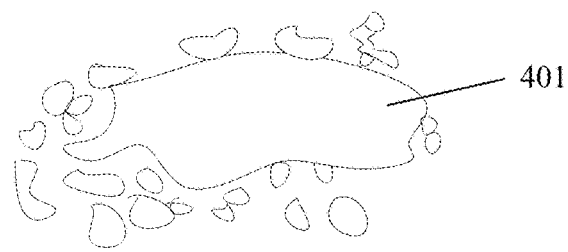
FIG. 4 is a schematic diagram of a target image according to an embodiment of the disclosure.

As shown in FIG. 3, the original image may include target objects, colors, textures, and the like. FIG. 4 shows a target image corresponding to the original image shown in FIG. 3. As shown in FIG. 4, the target image includes no color or texture, and only includes an original contour 401 of the plurality of target objects 301. The original image and the target image corresponding to the original image may be used as training data of a classification network model, and the classification network model may be used to distinguish target objects.

In some embodiments, the target image is generated according to the first location information of the at least one original contour in the original image. Therefore, the target image corresponding to the original image has the same size as the original image. If the image size of the original image exceeds a first reference size, the size of the generated target image also exceeds the first reference size. For example, the first reference size is a maximum size of an image that can be generated by using the current image processing technology. Therefore, when the image size of the original image exceeds the first reference size, the target image corresponding to the original image cannot be generated by using the current image processing technology. For example, the maximum size of the image that can be generated by using the current image processing technology is determined by a processing upper limit of a programming language, or an upper limit of data that can be processed by a hardware device. The hardware device is a memory or the like.

For example, the size of the original image is 100,000*100,000, and the maximum size of the image that can be processed by using the current image processing technology is 50,000*50,000. Therefore, the target image corresponding to the original image cannot be generated by using the current image processing technology.

In addition, when the original image and the target image of the original image are used as the training data of the network model, the original image and the target image of the original image need to be smaller than a second reference size. If the sizes of the original image and the target image exceed the second reference size, the original image and the target image of the original image cannot be used as the training data of the network model. For example, the second reference size is a maximum size of a training image used in an artificial intelligence algorithm. For example, the second reference size is 2000*2000.

In the present disclosure, since the size of the generated target image can be reduced by defining the target region and generating the target image corresponding to the target region, the size of the original image is not limited in the disclosure.

The first coordinates of the contour points are used to indicate locations of the contour points in the original image. The first coordinates of the contour points may be coordinates of the contour points in a two-dimensional coordinate system of the original image. In some embodiments, the two-dimensional coordinate system of the original image is a coordinate system with a vertex of the original image being an origin of the coordinates. For example, the vertex of the original image is a vertex of the lower left corner, a vertex of the lower right corner, a vertex of the upper left corner, a vertex of the upper right corner of the original image, or the like, and this is not limited in the embodiments of the disclosure. The two-dimensional coordinate system of the original image is a coordinate system used when the original image is generated, and any position point on the original image is determined according to the two-dimensional coordinate system.

In an example embodiment, the contour information further includes a contour identifier of the at least one original contour. The contour identifier is an identifier that uniquely determines the original contour. For example, the contour identifier is a sequence number, an identity (ID), or the like of the original contour, and the contour identifier is not limited in the embodiments of the disclosure. The contour identifier of the original contour and the first location information of the original contour are correspondingly stored. For example, the first location information of each original contour is stored in a file, and a file name of the file includes the contour identifier of the original contour.

Additionally, the contour identifier is added to the first location information of the original contour. For example, the first location information includes the first coordinates of the plurality of contour points in the original contour, and the first coordinates of the plurality of contour points are $[[x\_i\_1, y\_i\_1], [x\_i\_2, y\_i\_2], [x\_i\_3, y\_i\_3], \ldots, [x\_i\_n, y\_i\_n]]$, where x is the horizontal coordinate of the first coordinate, y is the vertical coordinate of the first coordinate, i is the contour identifier, and n is the quantity of contour points in the original contour, n being an integer greater than or equal to 3. Optionally, i is the sequence number of the original contour, i=1 means that the original contour is a first contour, i=2 means that the original contour is a second contour, and i=n means that the original contour is an $n^{th}$ contour.

For example, the method of obtaining the contour information is: obtaining the contour information of the original image by performing contour analysis processing on the original image; or obtaining the contour information from a local storage space.

The computer device obtains the contour information of the original image by analyzing and processing the original image. In an example embodiment, the original image includes at least one target object. The obtaining the contour information of the original image by analyzing and processing the original image by the computer device includes: determining, by the computer device, a pixel difference between a pixel value of any point and a pixel value of an adjacent point according to a pixel value of each point in the original image; using the any point as a contour point on the original contour in response to the pixel difference being greater than a reference difference; and obtaining location information of the plurality of contour points on the at least one original contour to obtain the contour information of the original image.

In an example embodiment, the original image includes at least one original contour, and the obtaining the contour information of the original image by analyzing and processing the original image by the computer device includes: obtaining, by the computer device in the two-dimensional coordinate system of the original image according to a location of at least one original contour on the original image, first coordinates of a plurality of contour points in the at least one original contour, and obtaining the contour information of the original image according to the first coordinates of the plurality of contour points in the at least one original contour.

The contour information may be alternatively obtained from the local storage space, and this is not limited in the embodiments of the disclosure. The local storage space includes the contour information of the at least one original image, and first location information of at least one original contour in an original image is stored in the same storage location.

For example, the contour information is obtained by manually drawing the original contour on the computer device by the user, or by performing contour analysis processing on the original image by the computer device, and this is not limited in the embodiments of the disclosure.

In an example embodiment, the contour information is obtained by manually drawing the original contour on the computer device by the user. The computer device displays the original image, and the user draws on the original image. The computer device generates, according to a detected sliding trajectory, an original contour corresponding to the sliding trajectory on the original image, and obtains first coordinates of a plurality of contour points in the original contour to obtain the contour information.

In some embodiments, the drawing of the user on the original image is a trigger operation on the original image. For example, the trigger operation is a click operation, a long-press operation, a drag operation, a double click operation, a sliding operation, or the like. For example, the trigger operation is triggered by the user through a mouse, or triggered by the user touching on the display screen. The trigger operation on the original image may be one or a combination of a plurality of trigger operations, or the like, and this is not limited in the embodiments of the disclosure.

In a possible implementation, the contour information is obtained by performing contour analysis processing on the original image by the computer device. The original image may include at least one target object, and the obtaining the contour information of the original image by analyzing and processing the original image by the computer device includes: determining, by the computer device according to a pixel value of any point on the original image and a pixel value of an adjacent point, a difference between the pixel value of the any point and the pixel value of the adjacent point; using the any point as a contour point on the original contour in response to the difference being greater than a reference difference to determine the original contour of the target object; and obtaining, according to locations of a plurality of contour points in the original contour in the two-dimensional coordinate system of the original image, first coordinates of the plurality of contour points in the original contour, and obtaining the contour information of the original image according to the first coordinates of the plurality of contour points in the original contour.

The original image may include a contour line of at least one original contour, and the obtaining the contour information of the original image by analyzing and processing the original image by the computer device includes: obtaining, by the computer device in the two-dimensional coordinate system of the original image according to a location of the contour line of the at least one original contour on the original image, first coordinates of a plurality of contour points in the at least one original contour, and obtaining the contour information of the original image according to the first coordinates of the plurality of contour points in the at least one original contour.

The manner of obtaining the contour information is only described by examples in this embodiment of the disclosure, and is not limited to the foregoing several obtaining manners. The contour information may be alternatively obtained in other manners. The manner of obtaining the contour information is not limited in the embodiments of the disclosure.

202: Obtain target region information, the target region information indicating a target region in the original image.

The target region information is information used for determining the target region. In an example embodiment, the target region information includes coordinates of a plurality of vertices of the target region. For example, the target region is a rectangular region, and the target region information is coordinates of four vertices of the target region. In another example embodiment, the target region information includes coordinates of any vertex of the target region, and a shape and a size of the target region. For example, the target region information includes that the shape of the target region is a rectangle, the length of the target region is 500, the width is 400, and coordinates of the vertex at the upper left corner of the target region are (18000, 25000). In other words, the shape, the size, and the position of the target region are all determined through the target region information.

The shape of the target region may be fixed. For example, the shape of the target region is a rectangle, a circle, or the like, and the target region information includes coordinates of any vertex of the target region and the size of the target region. In other words, the shape of the target region is default, and the position and size of the target region are determined through the target region information.

The target region information may be inputted by the user, or obtained by analyzing and processing the original image by the computer device. In an example embodiment, the computer device displays a region information obtaining page, and obtains the target region information inputted by the user through the region information obtaining page, the region information obtaining page being used for obtaining the target region information. For example, the region information obtaining page includes at least one region information input option.

In an example embodiment, the computer device segments the original image into a plurality of region images, performs contour recognition processing on each region image, and in response to a region image including the original contour, uses region information of the region image as the target region information. For example, the region image including the original contour means that the region image includes a complete original contour or a part of the original contour.

In some embodiments, a manner in which the computer device performs contour recognition processing on the region image to determine whether the original contour is included in the region image is to determine whether the original contour is included in the region image according to a difference between a pixel value of any point on the region image and a pixel value of an adjacent point, or determine whether the original contour is included in the regional image according to whether there are contour lines in the regional image. Other manners may be alternatively used to determine whether the original contour is included in the region image, and this is not limited in the embodiments of the disclosure.

Figure 5:
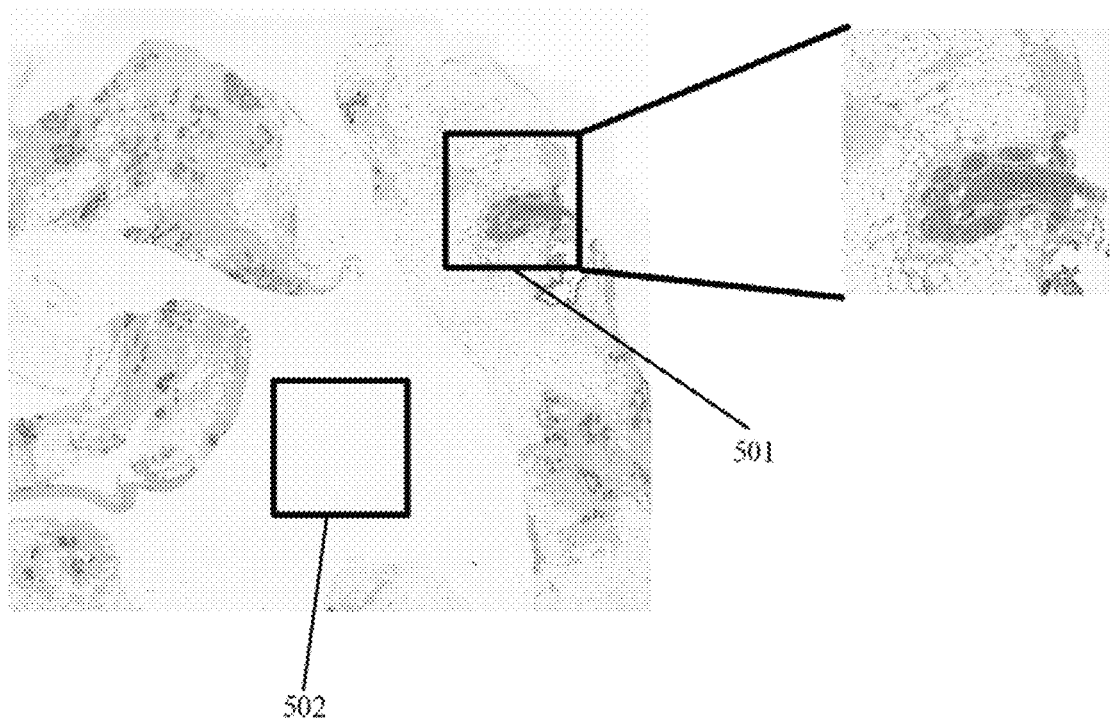
FIG. 5 is a schematic diagram of a target region in an original image according to an embodiment of the disclosure.

For example, as shown in FIG. 5, a region 501 of the original image includes a plurality of original contours. The computer device uses the region 501 as the target region, and obtains region information of the region 501 as the target region information. However, a region 502 of the original image includes no original contour, and the computer device does not use the region 502 as the target region.

203: Determine at least one target contour according to the contour information and the target region information, any target contour being wholly or partly located in a target region.

Figure 6:
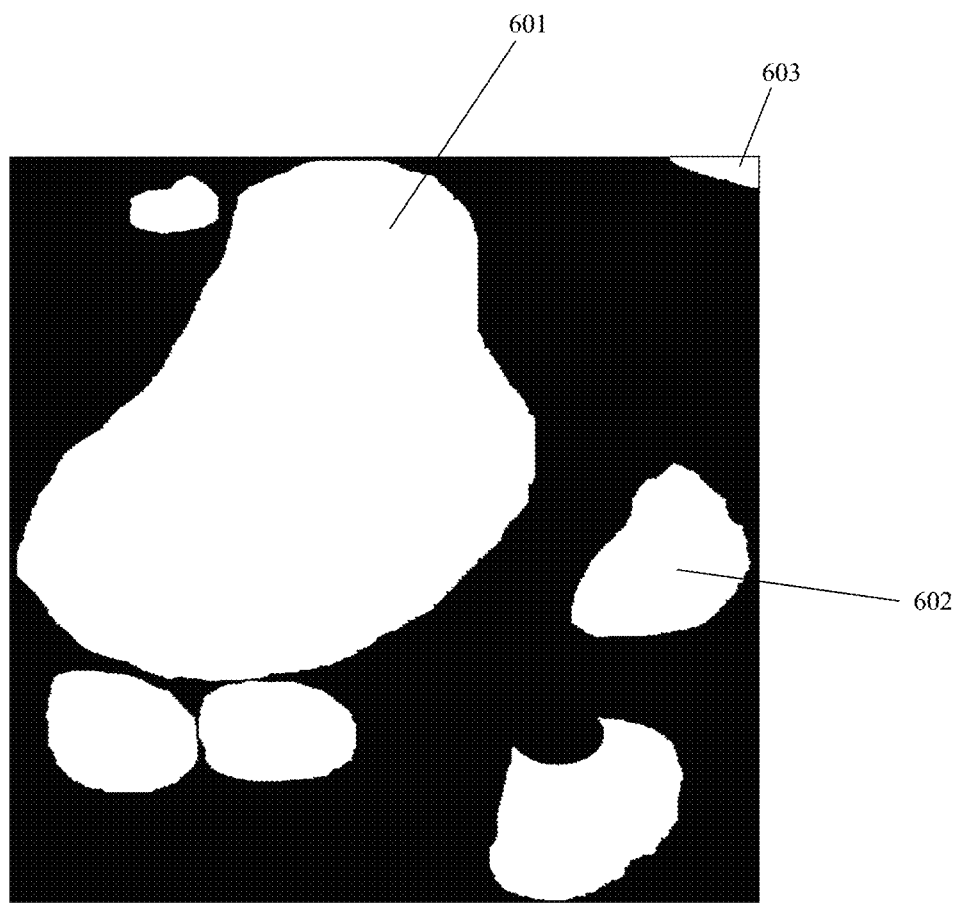
FIG. 6 is a schematic diagram of at least one target contour in a target region according to an embodiment of the disclosure.

Any target contour being wholly or partly located in a target region means that any target contour is wholly located in the target region or partly located in the target region. That is, the target region includes: a closed region corresponding to a complete target contour, or an unclosed region corresponding to an incomplete target contour. For example, as shown in FIG. 6, the target region is a rectangular region, and the target region includes a plurality of target contours. A first target contour 601 encloses a closed region, and the first target contour 601 is wholly located in the target region.

A second target contour 602 also encloses a closed region, and the second target contour 602 is also wholly located in the target region. A third target contour 603 does not enclose a closed region, and the third target contour 603 is partially located in the target region.

In an example embodiment, the determining at least one target contour according to the contour information and the target region information includes: determining, in response to determining that any contour point is located in the target region according to the contour information and the target region information, an original contour to which the any contour point belongs as a target contour.

The location information of a contour point may include a contour identifier of the original contour to which the contour point belongs, and the computer device may obtain the contour identifier included in the location information of the contour point. According to the contour identifier included in the location information of the contour point, the original contour to which the contour point belongs is determined, and then the determined original contour is determined as the target contour. That is, by obtaining the contour identifier of the original contour, the original contour is determined as the target contour.

For example, coordinates of a contour point located in the target region are [x_2_n, y_2_n], where 2 is a contour identifier of the original contour. The contour identifier of the original contour to which the contour point belongs may be obtained according to the coordinates of the contour point. Subsequently, according to the contour identifier, first location information of the original contour whose contour identifier is 2 may be obtained from the contour information.

In the foregoing manner, each time the target contour in the target region is determined according to the target region information, contour points of each original contour need to be searched and compared. If a target contour in each target region needs to be determined according to a plurality of pieces of target region information, contour points of each original contour need to be searched and compared repeatedly.

Therefore, in this embodiment of the disclosure, at least one target contour in the reduced target region may be further determined in the first image by generating a first image. The first image is a target image corresponding to the reduced original image.

In another example embodiment, the determining at least one target contour according to the contour information and the target region information includes: reducing the first location information of the at least one original contour to obtain third location information of at least one first contour, any first contour being a contour after a corresponding original contour is reduced, and the first location information of the at least one original contour having a same reduction ratio; generating a first image corresponding to the original image according to the third location information of the at least one first contour, the first image including the at least one first contour; reducing the target region information to obtain first region information, the first region information indicating the reduced target region, and a reduction ratio of the target region information being equal to the reduction ratio of the first location information of the at least one original contour; and determining the at least one target contour according to the first region information and the first image.

In some embodiments, the reducing the first location information of the at least one original contour is to reduce coordinates of a plurality of contour points on each original contour. If the coordinates of the contour points include horizontal coordinates and vertical coordinates, the horizontal coordinates and the vertical coordinates of the contour points need to be reduced, where the horizontal coordinates and the vertical coordinates have the same reduction ratio. For example, the horizontal coordinate of each contour point is reduced by 10 times, and the vertical coordinate of each contour point is reduced by 10 times, to obtain the third location information of at least one first contour.

The generating a first image corresponding to the original image according to the third location information of the at least one first contour may include: establishing a two-dimensional coordinate system and determining a location of each contour point in the two-dimensional coordinate system according to the third location information of the at least one first contour; and generating the first image in the two-dimensional coordinate system according to the location of each contour point in the two-dimensional coordinate system. Since the coordinates of each contour point are reduced, the generated first image is also reduced, and a reduction ratio of the first image relative to the original image is equal to the reduction ratio of the coordinates of each contour point.

The contour information may further include a contour identifier of the at least one original contour, and the generating a first image corresponding to the original image according to the third location information of the at least one first contour includes: generating the first image according to the third location information of the at least one first contour and the contour identifier of the at least one original contour, the first image including the at least one first contour and a contour identifier of the at least one first contour, and a contour identifier of any first contour being a contour identifier of an original contour corresponding to the any first contour.

Figure 7:
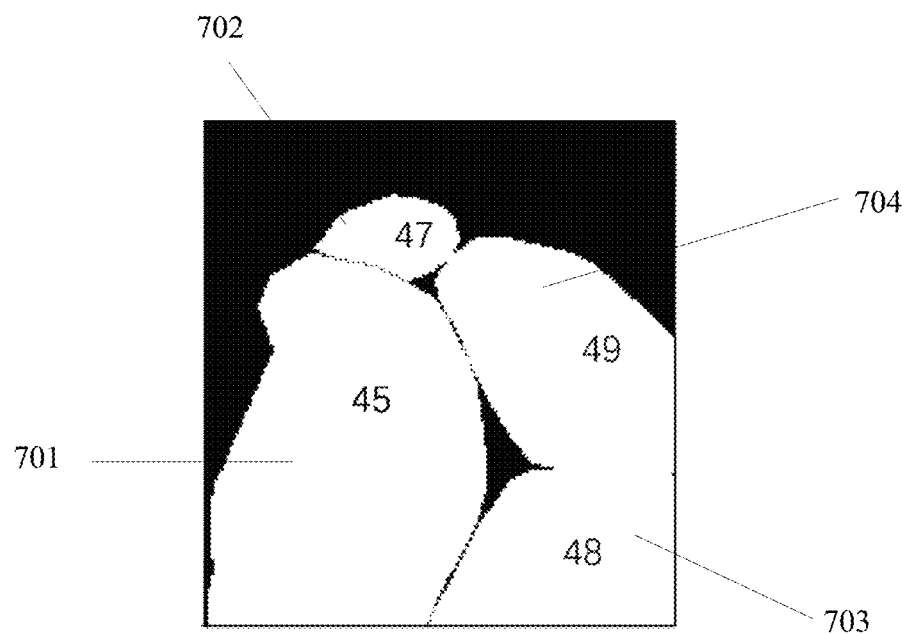
FIG. 7 is a schematic diagram of a first image according to an embodiment of the disclosure.

For example, as shown in FIG. 7, a region enclosed by a contour 701 in the first image includes a contour identifier 45 of the contour 701, a region enclosed by a contour 702 includes a contour identifier 47 of the contour 702, a region enclosed by a contour 703 includes a contour identifier 48 of the contour 703, and a region enclosed by a contour 704 includes a contour identifier 49 of the contour 704.

The determining the at least one target contour according to the first region information and the first image may include: determining a contour identifier of at least one second contour according to the at least one first contour in the first image, the contour identifier of the at least one first contour, and the first region information, the at least one second contour being a first contour that is wholly or partly located in the reduced target region in the first image; and determining an original contour corresponding to the at least one second contour as a target contour according to the contour identifier of the at least one second contour.

Figure 8:
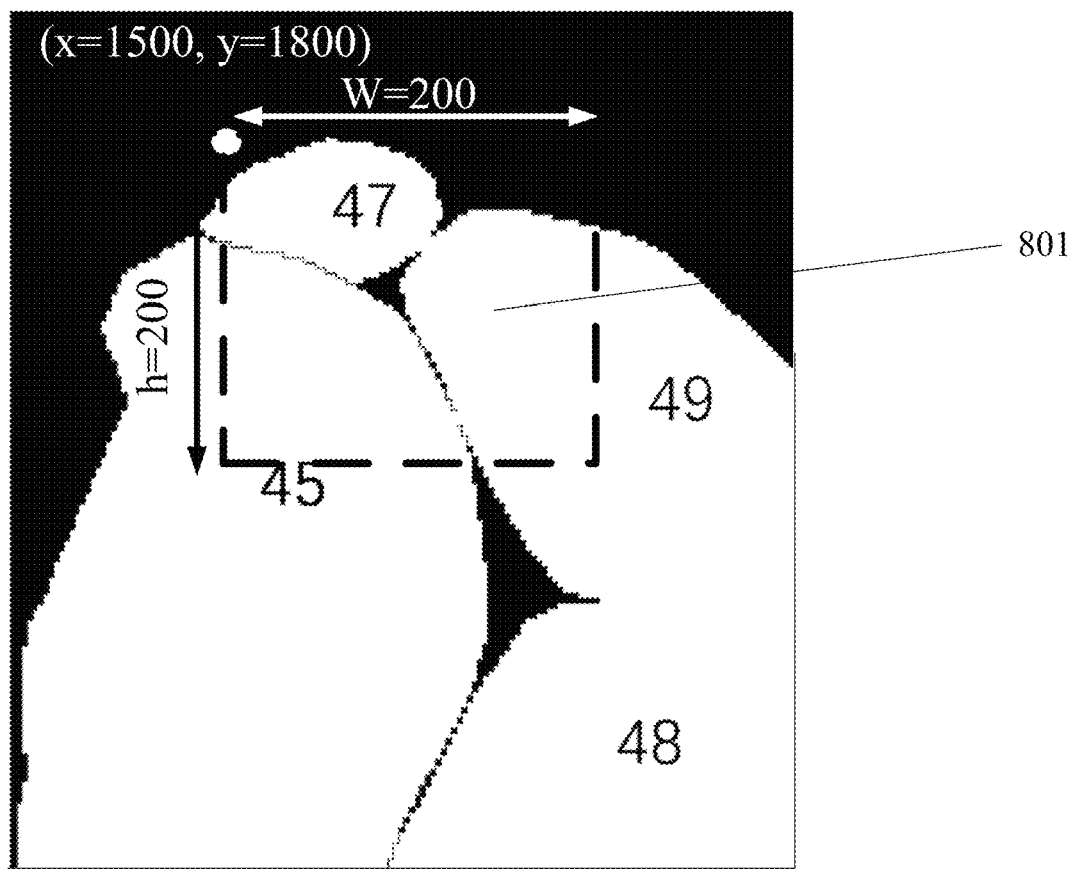
FIG. 8 is a schematic diagram of a partial region of a first image according to an embodiment of the disclosure.
Figure 9:
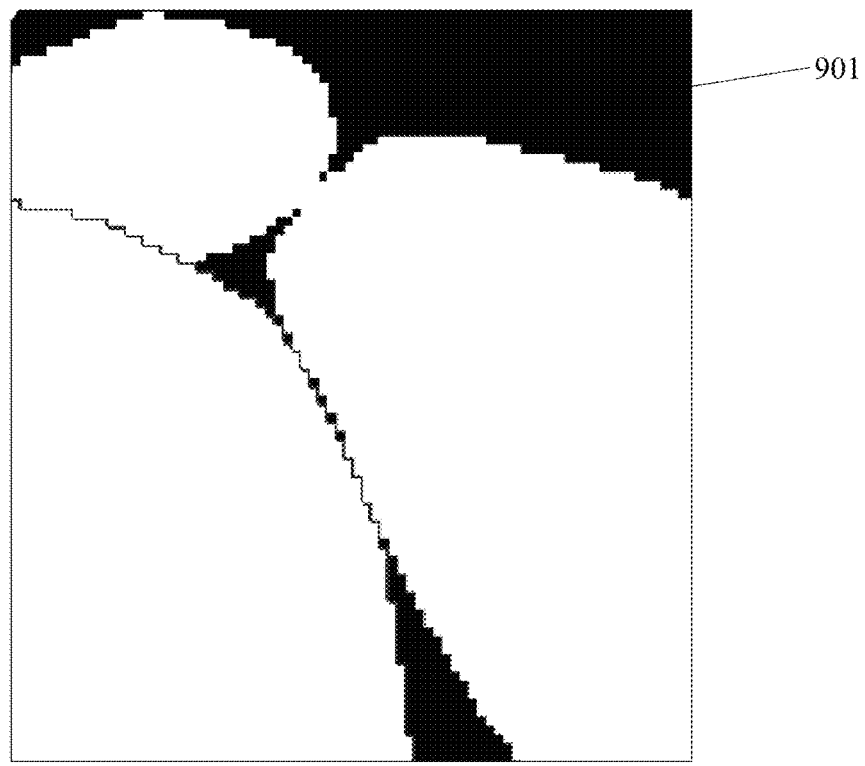
FIG. 9 is a schematic diagram of a contour in a first region according to an embodiment of the disclosure.

For example, the target region information includes that: coordinates of a vertex at the upper left corner of the target region are (30000, 36000), the length of the target region is 4000, and the width of the target region is 4000. After reducing the first location information of the original contour by 20 times, the computer device obtains the third location information of the first contour, and generates the first image according to the third location information of the first contour. FIG. 8 shows a partial region of the first image. Since the first location information is reduced by 20 times, the target region information needs to be also reduced by 20 times to obtain the first region information. As shown in FIG. 8, the first region information includes that: coordinates of a vertex at the top left corner of the first region 801 are (1500, 1800), the length of the first region 801 is 200, and the width of the first region 801 is 200. According to the at least one first contour in the first image, the contour identifier of the at least one first contour, and the first region information, it may be determined that contour identifiers of at least one first contour wholly or partly located in the reduced target region in the first image are respectively 45, 47, and 49, that is, it is determined that contour identifiers of at least one second contour are 45, 47, and 49 respectively. FIG. 9 shows three contours in the first region 901.

The generating the first image according to the third location information of the at least one first contour and the contour identifier of the at least one original contour may include: setting a pixel value in a contour region corresponding to any first contour as the contour identifier of the any first contour; and generating the first image according to the third location information of the at least one first contour and a pixel value in a contour region corresponding to the at least one first contour. For example, the generated first image includes colors, or includes three colors of black, gray, and white, and this is not limited in the embodiments of the disclosure.

Figure 10:
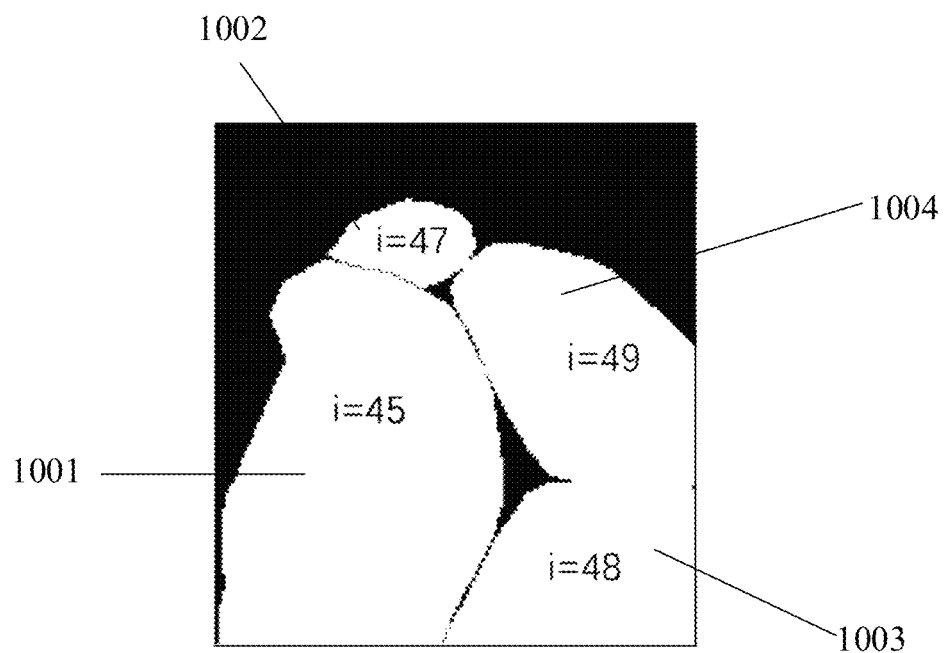
FIG. 10 is a schematic diagram of a partial region of another first image according to an embodiment of the disclosure.

For example, FIG. 10 shows a partial region of the first image. FIG. 10 does not show different pixel values in contour regions corresponding to different contours, but uses the letter i to indicate a pixel value in a contour region, where i=45 indicates that a pixel value in a contour region 1001 is 45; i=47 indicates that a pixel value in a contour region 1002 is 47; i=48 indicates that a pixel value in a contour region 1003 is 48; and i=49 indicates that a pixel value in a contour region 1004 is 49. By obtaining a pixel value of each contour region, a contour identifier of each target contour is obtained.

Through the first region information and the first image, at least one target contour located in the target region can be quickly determined, which improves the speed of determining the at least one target contour, so that the computer device can draw the target image as soon as possible according to the first location information of the target contour, thereby improving the efficiency of generating the target image.

In operation 203, the computer device obtains the contour identifier of the target contour. Before operation 204, the computer device may further obtain the first location information of the at least one target contour from the contour information according to the contour identifier of the at least one target contour.

For example, the target region includes three target contours, and contour identifiers of the three target contours are 45, 47, and 49 respectively. The contour information is searched according to 45, 47 and 49, to obtain first location information of the three target contours. The first location information of the three target contours is:

[[x_45_1, y_45_1], [x_45_2, y_45_2], [x_45_3, y_45_3], . . . , [x_45_n, y_45_n]],
[[x_47_1, y_47_1], [x_47_2, y_47_2], [x_47_3, y_47_3], . . . , [x_47_n, y_47_n]],
[[x_49_1, y_49_1], [x_49_2, y_49_2], [x_49_3, y_49_3], . . . , [x_49_n, y_49_n]].

204: Decrease first coordinates of a plurality of contour points in the at least one target contour to obtain second location information of the at least one target contour, second location information of any target contour including second coordinates of a plurality of contour points in the any target contour, and the first coordinates of the plurality of contour points in the at least one target contour having a same decreasing extent.

When the image corresponding to the target contour is generated according to the coordinates of the target contour, the size of the image corresponding to the target contour is a*b, where a is a maximum horizontal coordinate of the target contour and b is a maximum vertical coordinate of the target contour. Therefore, the size of the image corresponding to the target contour is not only related to the size of the target contour, but also related to the coordinates of the target contour. The coordinates of each contour point in the target contour are decreased to reduce useless regions as much as possible and also make the size of the generated image smaller, thereby avoiding the phenomenon of a relatively large size of the obtained image when generating the image corresponding to the target contour according to the coordinates of the target contour. For example, when the coordinates are decreased, the decreasing extent is any value greater than zero.

In an example embodiment, the first coordinates include horizontal coordinates and vertical coordinates, and before the decreasing first coordinates of a plurality of contour points in the at least one target contour to obtain second location information of the at least one target contour, the method further includes: obtaining a first minimum horizontal coordinate and a first minimum vertical coordinate according to first location information of the at least one target contour; determining the first minimum horizontal coordinate as a decreasing extent of horizontal coordinates of the plurality of contour points in the at least one target contour; and determining the first minimum vertical coordinate as a decreasing extent of vertical coordinates of the plurality of contour points in the at least one target contour.

For example, in the first location information of the at least one target contour, the minimum horizontal coordinate (that is, the first minimum horizontal coordinate) is 5543, and the minimum vertical coordinate (that is, the first minimum vertical coordinate) is 4796. (5543, 4796) is used as the decreasing extent, that is, (5543, 4796) is subtracted from the first coordinates of each contour point on the target contour. If first coordinates of a contour point are (6543, 5796), (5543, 4796) is subtracted from (6543, 5796), and the obtained coordinates are updated as the second coordinates of the contour point.

For example, the first location information of the at least one target contour, the first minimum horizontal coordinate, and the first minimum vertical coordinate meet the following relationship:

x_min=MIN[x_i_n];
y_min=MIN[y_i_n];
where x_min is the first minimum horizontal coordinate, y_min is the first minimum vertical coordinate, i is the contour identifier, and n is a quantity of contour points of any target contour, n being an integer greater than or equal to 3; and MIN[ ] is a function of taking a minimum value, x is the horizontal coordinate, y is the horizontal coordinate, [x_i_n] is any horizontal coordinate in the first location information of the at least one target contour, and [y_i_n] is any vertical coordinate in the first location information of the at least one target contour.

In some embodiments, the decreasing first coordinates of a plurality of contour points in the at least one target contour to obtain second location information of the at least one target contour includes: decreasing horizontal coordinates in the first coordinates of the plurality of contour points in the at least one target contour according to a decreasing extent of the horizontal coordinates; and decreasing vertical coordinates in the first coordinates of the plurality of contour points in the at least one target contour according to a decreasing extent of the vertical coordinates, to obtain the second coordinates of the plurality of contour points in the at least one target contour.

The second location information of the at least one target contour, the first location information of the at least one target contour, the first minimum horizontal coordinate, and the first minimum vertical coordinate may meet the following relationship:

contour_list_local=contour_list-[x_min,y_min],
where contour_list_local is a second coordinate list of the contour points of the at least one target contour, and contour_list is a first coordinate list of the contour points of the at least one target contour; and x_min is the first minimum horizontal coordinate, and y_min is the first minimum vertical coordinate.

That is, an origin of a coordinate system of coordinates of contours in the target region is set to [x_min, y_min], and the target image can be generated in the coordinate system based on contour_list_local subsequently.

The first minimum horizontal coordinate and the first minimum vertical coordinate of the at least one target contour are used as the decreasing extent to decrease the first coordinates of a plurality of contour points in each target contour, which is equivalent to cutting the image corresponding to the target contour, thereby reducing the size of the target image corresponding to the target region.

In another example embodiment, the first coordinates include horizontal coordinates and vertical coordinates, and before the decreasing first coordinates of a plurality of contour points in the at least one target contour to obtain second location information of the at least one target contour, the method further includes: obtaining a second minimum horizontal coordinate and a second minimum vertical coordinate of the target region according to the target region information; determining the second minimum horizontal coordinate as a decreasing extent of horizontal coordinates of the plurality of contour points in the at least one target contour; and determining the second minimum vertical coordinate as a decreasing extent of vertical coordinates of the plurality of contour points in the at least one target contour. That is, the horizontal coordinates in the first coordinates of the plurality of contour points in the target contour need to be subtracted from the second minimum horizontal coordinate of the target region, and the vertical coordinates in the first coordinates of the plurality of contour points in the target contour need to be subtracted from the second minimum vertical coordinate of the target region, which is equivalent to using the vertex of the target region as the coordinate origin of the contour coordinate system, and generating the target image with the coordinate origin, thereby reducing the size of the target image.

The second minimum horizontal coordinate and the first minimum horizontal coordinate may be the same or different, which is related to the actual situation of the first location information of the at least one target contour and the target region information. This is not limited in this embodiment of the disclosure. In addition, the second minimum vertical coordinate and the first minimum vertical coordinate may be the same or different, which is also related to the actual situation of the first location information of the at least one target contour and the target region information.

205: Generate a target image corresponding to the target region according to the second location information of the at least one target contour and the target region information, the target image including a contour located in the target region.

In an example embodiment, the generating a target image corresponding to the target region according to the second location information of the at least one target contour and the target region information includes: generating a third image according to the second location information of the at least one target contour, the third image comprising the at least one target contour; and cutting the target region in the third image according to the target region information to obtain the target image corresponding to the target region.

In some embodiments, the cutting the target region in the third image according to the target region information to obtain the target image corresponding to the target region includes: decreasing the coordinates included in the target region information to obtain the updated target region information; determining the target region in the third image according to the updated target region information; and cutting the target region in the third image to obtain the target image corresponding to the target region. The decreasing extent of the coordinates included in the target region information is equal to the decreasing extent of the first coordinates of the plurality of contour points in the at least one target contour.

For example, for the case that the target region information includes the coordinates of the plurality of vertices of the target region, reducing the coordinates included in the target region information refers to reducing the coordinates of the plurality of vertices of the target region included in the target region information. The decreasing extent of the coordinates of the plurality of vertices of the target region is equal to the decreasing extent of the first coordinates of the plurality of contour points in the at least one target contour.

For example, for the case that the target region information includes coordinates of any vertex of the target region and the size of the target region, reducing the coordinates included in the target region information refers to reducing the coordinates of the any vertex included in the target region information. In this case, the size of the target region included in the target region information remains unchanged.

In either case, after the coordinates included in the target region information are reduced, the updated target region information can be obtained, and indicate the target region in the third image. In other words, the target region in the third image may be directly determined according to the updated target region information, and then the target image may be obtained by cutting out the target region.

Figure 11:
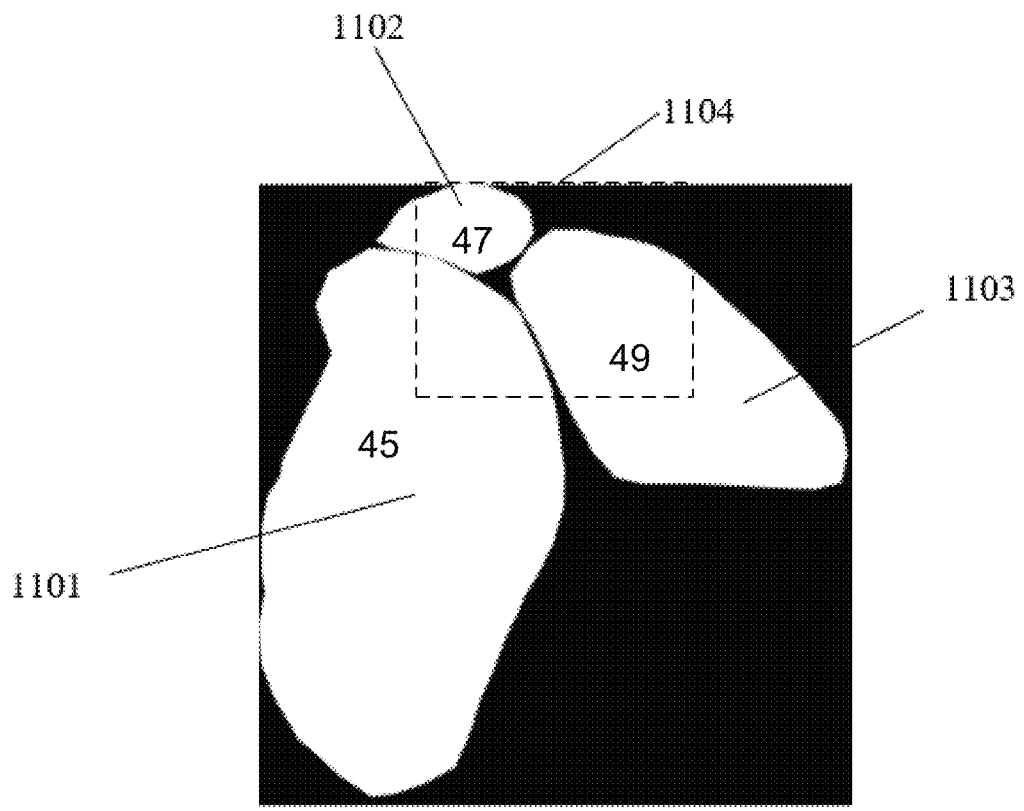
FIG. 11 is a schematic diagram of a third image according to an embodiment of the disclosure.
Figure 12:
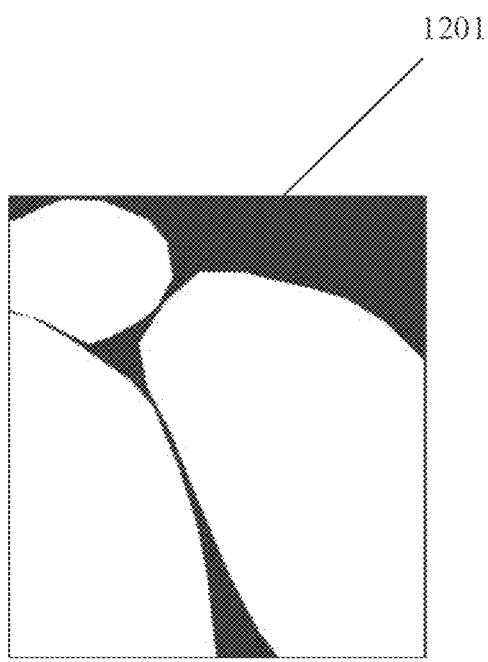
FIG. 12 is a schematic diagram of another target image according to an embodiment of the disclosure.

For example, the third image is shown in FIG. 11. FIG. 11 includes complete contours of 3 target contours. FIG. 11 shows contour images of the three target contours: a contour 1101 with a contour identifier of 45, a contour 1102 with a contour identifier of 47, and a contour 1103 with a contour identifier of 49. FIG. 11 further includes a target region 1104. The target region 1104 in FIG. 11 is cut out to obtain a target image 1201 as shown in FIG. 12.

In an example embodiment, the generating a target image corresponding to the target region according to the second location information of the at least one target contour and the target region information includes: determining contour points located in the target region in the at least one target contour according to second coordinates of the plurality of contour points in the at least one target contour and the target region information; and generating the target image according to second coordinates of the contour points located in the target region in the at least one target contour and the target region information.

In some embodiments, the determining contour points located in the target region in the at least one target contour according to second coordinates of the plurality of contour points in the at least one target contour and the target region information includes: decreasing the coordinates included in the target region information to obtain the updated target region information; and determining contour points located in the target region in the at least one target contour according to second coordinates of the plurality of contour points in the at least one target contour and the updated target region information. The decreasing extent of the coordinates included in the target region information is equal to the decreasing extent of the first coordinates of the plurality of contour points in the at least one target contour.

In some embodiments, the generating the target image according to second coordinates of the contour points located in the target region in the at least one target contour and the target region information includes: decreasing the coordinates included in the target region information to obtain the updated target region information; and generating the target image according to second coordinates of the contour points located in the target region in the at least one target contour and the updated target region information. The decreasing extent of the coordinates included in the target region information is equal to the decreasing extent of the first coordinates of the plurality of contour points in the at least one target contour.

According to the image generation method provided in the embodiments of the disclosure, the target region is defined so that the computer device only needs to generate the target image corresponding to the target region and does not need to generate images corresponding to other regions. The coordinates of the plurality of contour points on the target contour are decreased to achieve the effect of cutting off the images corresponding to other regions, thereby reducing the size of the target image. In addition, the coordinates of the plurality of contour points on the target contour in the disclosure have the same decreasing extent, to ensure that a distance between contours in the target image is the same as a distance between corresponding contours in the original image, thereby avoiding the problem of contour adhesion, and ensuring the accuracy of the generated target image.

In addition, the minimum horizontal coordinate in the at least one target contour may be used as the decreasing extent of the horizontal coordinated of each contour point in the at least one target contour, and the minimum vertical coordinate in the at least one target contour may be used as the decreasing extent of the vertical coordinate of each contour point in the at least one target contour, which is equivalent to using the minimum horizontal coordinate and the minimum vertical coordinate as the origin of the contour coordinate system of the target image, avoiding drawing the region outside the at least one target contour as much as possible, and reducing the size of the target image.

In addition, the minimum horizontal coordinate in the target region information may be used as the decreasing extent of the horizontal coordinated of each contour point in the at least one target contour, and the minimum vertical coordinate in the target region information may be used as the decreasing extent of the vertical coordinate of each contour point in the at least one target contour, which is equivalent to using the minimum horizontal coordinate and the minimum vertical coordinate in the target region information as the origin of the contour coordinate system of the target image, avoiding drawing the region outside the target region as much as possible, and reducing the size of the target image.

In addition, according to the disclosure, the first location information of at least one original contour is further reduced to generate the first image corresponding to the original image. The first image may include the contour identifier of at least one original contour. The first image may be regarded as an index image of the original image. At least one target contour located in the target region in the original image can be determined according to the target region information of the original image and the first image, which increases the speed of determining at least one target contour located in the target region, and also improves the efficiency of generating the target image.

The image generation method provided in the embodiments of the disclosure is applicable to a process of processing a pathological WSI. At present, classification processing of pathological WSIs is increasingly based on classification network models. To use a classification network model to classify pathological WSIs, the classification network model needs to be trained first, and then the trained classification network model is used to classify the pathological WSIs.

When the classification network model is trained, a sample pathological WSI and a target image corresponding to the sample pathological WSI need to be obtained first. For example, the sample pathological WSI includes a target object or target region, and the target image corresponding to the sample pathological WSI includes a contour of the target object or a contour of the target region. In this embodiment, the sample pathological WSI including a target object is taken as an example for description.

In some embodiments, the sample pathological WSI includes at least one target object, and a target contour corresponding to the sample pathological WSI includes a contour of the at least one target object. The sample pathological WSI and the target image are used as training sample data and inputted into the classification network model. The classification network model may process the WSI to determine the contour of the target object in the WSI, determine whether a classification result is correct according to the contour in the target image corresponding to the sample pathological WSI, and then adjust parameters of the classification network model according to a difference between an output result of the classification model and location information of the contour in the target image, so that the classification result of the classification network model is more accurate. After the training of the classification network model is completed, the target object in the WSI may be recognized based on the classification network model.

The size of the sample pathological WSI is relatively large, and the target image is the same size as the sample pathological WSI. Therefore, at present, the scaled sample pathological WSI and the scaled target image are used as the sample training data. In the scaled image, if two contours are close to each other, the two contours are adhered to form a contour. The error in the target image used to train the classification network model reduces the accuracy of the classification network model.

Figure 13:
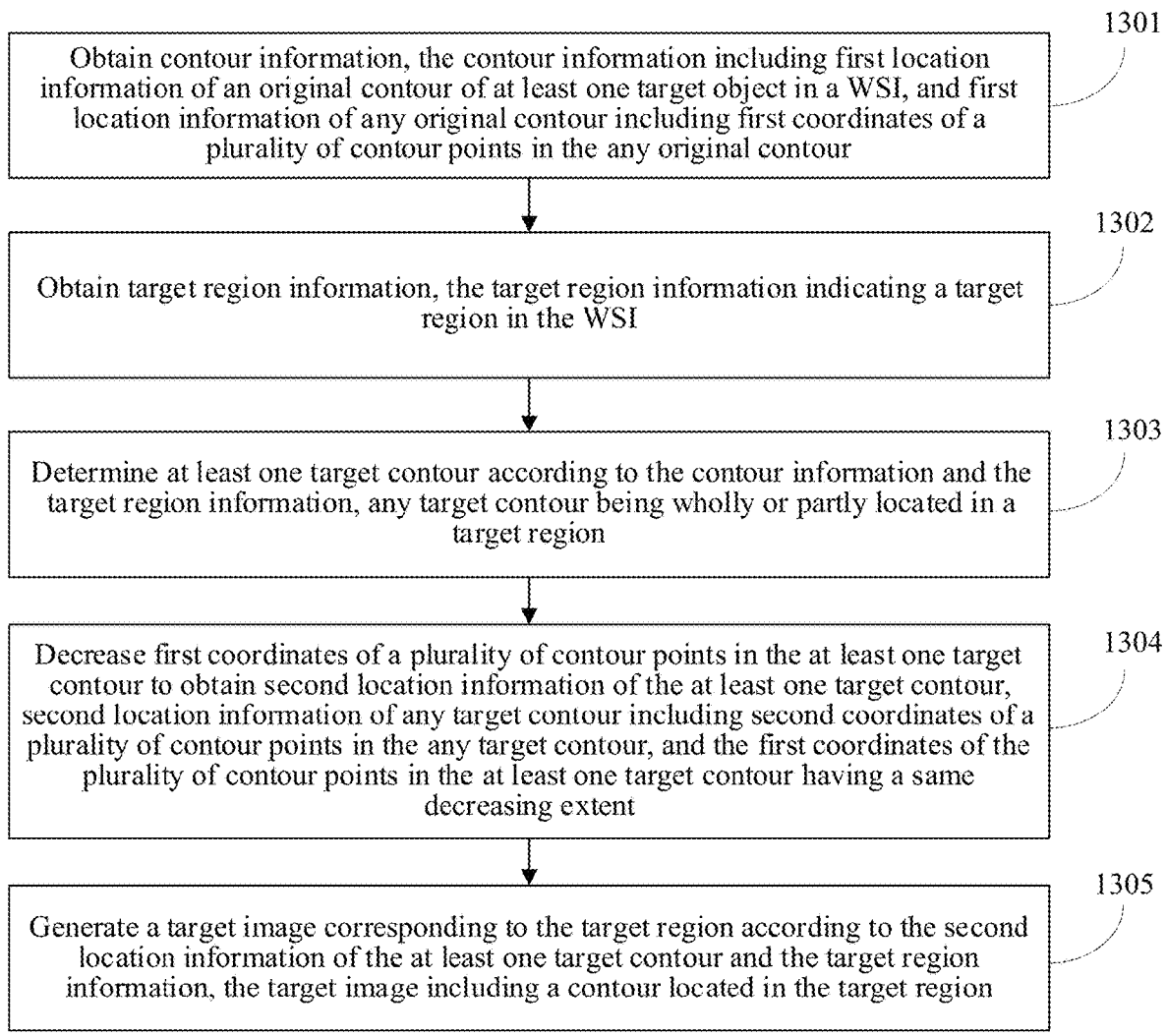
FIG. 13 is a flowchart of a method for generating a target image of a WSI according to an embodiment of the disclosure.

The disclosure provides a method for generating a target image of a WSI. The method is applied to a computer device. As shown in FIG. 13, the method for generating a target image of a WSI includes the following operations:

1301: Obtain contour information, the contour information including first location information of an original contour of at least one target object in a WSI, and first location information of any original contour including first coordinates of a plurality of contour points in the any original contour.

In some embodiments, a WSI is an image including a target object. For example, the target object is a cancerous cell, a diseased blood vessel, a non-cancerous cell, a non-diseased blood vessel, or the like. The target object is not limited in the embodiments of the disclosure.

1302: Obtain target region information, the target region information indicating a target region in the WSI.

1303: Determine at least one target contour according to the contour information and the target region information, any target contour being wholly or partly located in a target region.

In an example embodiment, the determining at least one target contour according to the contour information and the target region information includes: determining, based on determining that any contour point is located in the target region according to the contour information and the target region information, an original contour to which the any contour point belongs as a target contour.

In an example embodiment, the determining at least one target contour according to the contour information and the target region information includes: reducing the first location information of the at least one original contour to obtain third location information of at least one first contour, any first contour being a contour after a corresponding original contour is reduced, and the first location information of the at least one original contour having a same reduction ratio; generating a first image corresponding to the WSI according to the third location information of the at least one first contour, the first image including the at least one first contour; reducing the target region information to obtain first region information, the first region information indicating the reduced target region, and a reduction ratio of the target region information being equal to the reduction ratio of the first location information of the at least one original contour; and determining the at least one target contour according to the first region information and the first image.

The contour information may further include a contour identifier of the at least one original contour; and the generating a first image corresponding to the WSI according to the third location information of the at least one first contour includes: generating the first image according to the third location information of the at least one first contour and the contour identifier of the at least one original contour, the first image including the at least one first contour and a contour identifier of the at least one first contour, and a contour identifier of any first contour being a contour identifier of an original contour corresponding to the any first contour.

The determining the at least one target contour according to the first region information and the first image may include: determining a contour identifier of at least one second contour according to the at least one first contour in the first image, the contour identifier of the at least one first contour, and the first region information, the at least one second contour being a first contour that is wholly or partly located in the reduced target region in the first image; and determining an original contour corresponding to the at least one second contour as a target contour according to the contour identifier of the at least one second contour.

The generating the first image according to the third location information of the at least one first contour and the contour identifier of the at least one original contour may include: setting a pixel value in a contour region corresponding to any first contour as the contour identifier of the any first contour; and generating the first image according to the third location information of the at least one first contour and a pixel value in a contour region corresponding to the at least one first contour.

1304: Decrease first coordinates of a plurality of contour points in the at least one target contour to obtain second location information of the at least one target contour, second location information of any target contour including second coordinates of a plurality of contour points in the any target contour, and the first coordinates of the plurality of contour points in the at least one target contour having a same decreasing extent.

In an example embodiment, the first coordinates include horizontal coordinates and vertical coordinates, and before the decreasing first coordinates of a plurality of contour points in the at least one target contour to obtain second location information of the at least one target contour, the method further includes: obtaining a first minimum horizontal coordinate and a first minimum vertical coordinate according to first location information of the at least one target contour; determining the first minimum horizontal coordinate as a decreasing extent of horizontal coordinates of the plurality of contour points in the at least one target contour; and determining the first minimum vertical coordinate as a decreasing extent of vertical coordinates of the plurality of contour points in the at least one target contour.

In an example embodiment, the first coordinates include horizontal coordinates and vertical coordinates, and before the decreasing first coordinates of a plurality of contour points in the at least one target contour to obtain second location information of the at least one target contour, the method further includes: obtaining a second minimum horizontal coordinate and a second minimum vertical coordinate of the target region according to the target region information; determining the second minimum horizontal coordinate as a decreasing extent of horizontal coordinates of the plurality of contour points in the at least one target contour; and determining the second minimum vertical coordinate as a decreasing extent of vertical coordinates of the plurality of contour points in the at least one target contour.

1305: Generate a target image corresponding to the target region according to the second location information of the at least one target contour and the target region information, the target image including a contour located in the target region.

In an example embodiment, the generating a target image corresponding to the target region according to the second location information of the at least one target contour and the target region information includes: generating a third image according to the second location information of the at least one target contour, the third image comprising the at least one target contour; and cutting the target region in the third image according to the target region information, to obtain the target image corresponding to the target region.

In an example embodiment, the generating a target image corresponding to the target region according to the second location information of the at least one target contour and the target region information includes: determining contour points located in the target region in the at least one target contour according to second coordinates of the plurality of contour points in the at least one target contour and the target region information; and generating the target image according to second coordinates of the contour points located in the target region in the at least one target contour and the target region information.

The target image corresponding to the target region of the WSI is generated by using the foregoing method, which reduces the size of the generated target image. Subsequently, the image corresponding to the target region may be cut from the WSI according to the target region, and the image and the target image are used as the training data of the classification network model. Since a distance between contours in the target image is the same as a distance between corresponding contours in the WSI, the accuracy of the target image is guaranteed, thereby improving the accuracy of training the classification network model.

Figure 14:
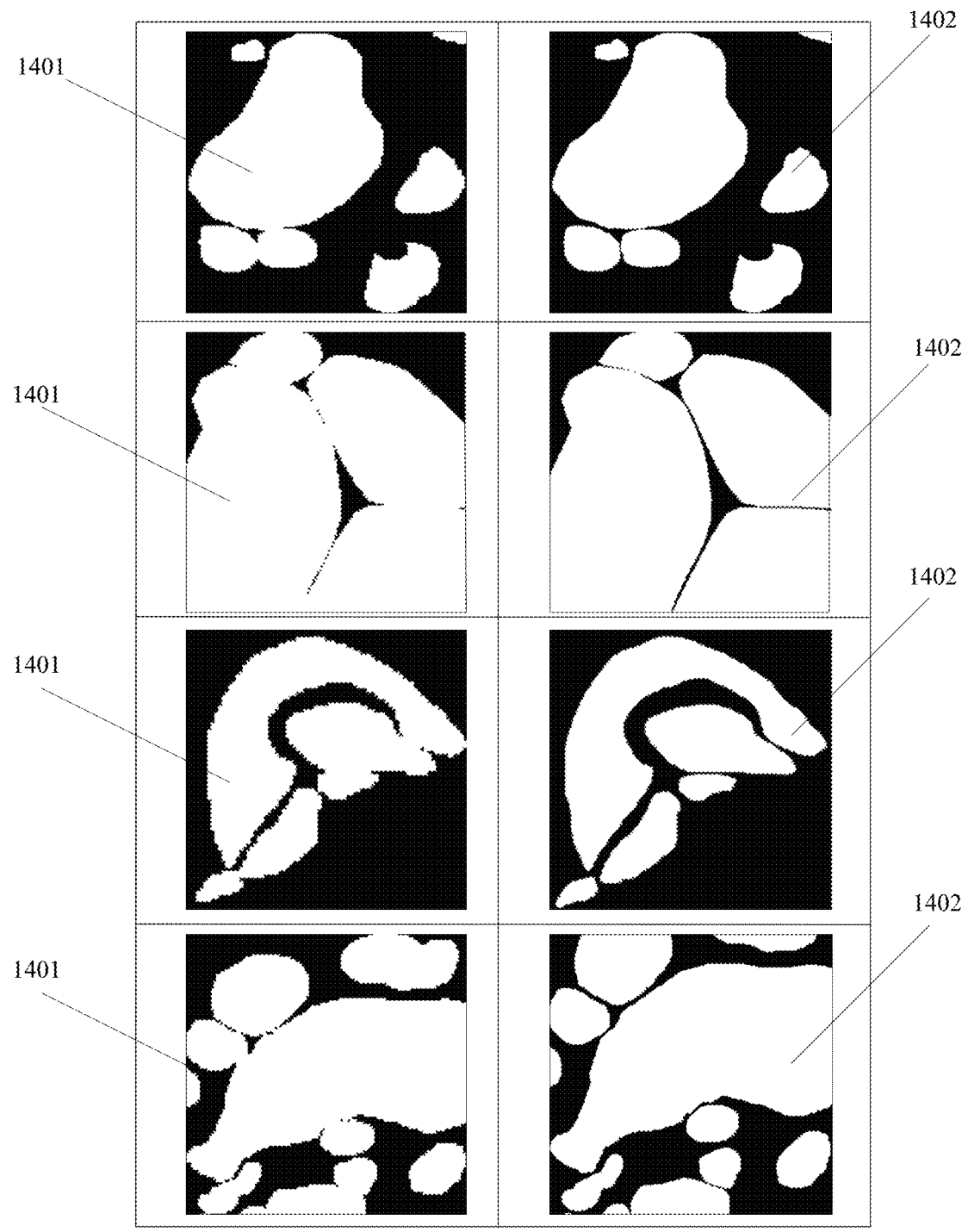
FIG. 14 is a schematic diagram of a comparison between a target image generated by using the related art and a target image generated by using a method according to an embodiment of the disclosure.

FIG. 14 is a schematic diagram of a comparison between a target image generated by using the related art and a target image generated by using a method provided in the disclosure. As shown in FIG. 14, contour lines in a target image 1401 generated by using the related art are blurred, and the contour lines are adhered. The computer device misjudges the adhered contour lines as one contour. However, contour lines in a target image 1402 generated by using the method provided in the disclosure are clear, and boundaries between the contour lines are clear, which avoids misjudgment by the computer device. Moreover, after target images corresponding to a plurality of target regions are generated, the plurality of target images may be combined according to a position relationship between the target images, and the plurality of target images may be combined into a target image corresponding to the WSI.

Figure 15:
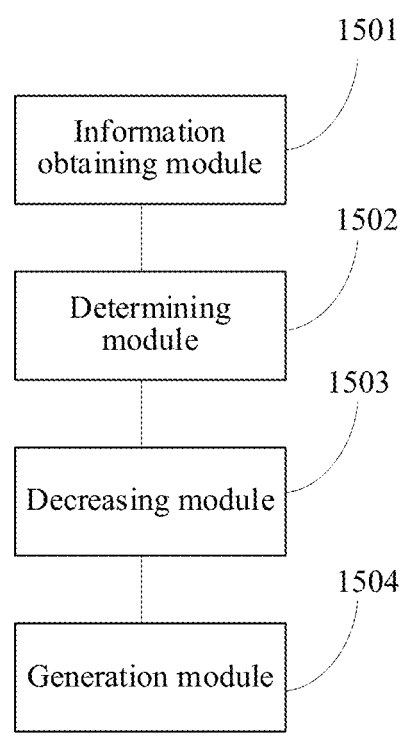
FIG. 15 is a schematic structural diagram of an image generation apparatus according to an embodiment of the disclosure.

FIG. 15 is a schematic structural diagram of an image generation apparatus according to an embodiment of the disclosure. Referring to FIG. 15, the apparatus includes:

an information obtaining module 1501, configured to obtain contour information and target region information, the contour information including first location information of at least one original contour in an original image, first location information of any original contour including first coordinates of a plurality of contour points in the any original contour, and the target region information indicating a target region in the original image;

a determining module 1502, configured to determine at least one target contour according to the contour information and the target region information, any target contour being wholly or partly located in the target region;

a decreasing module 1503, configured to decrease first coordinates of a plurality of contour points in the at least one target contour to obtain second location information of the at least one target contour, second location information of any target contour including second coordinates of a plurality of contour points in the any target contour, and the first coordinates of the plurality of contour points in the at least one target contour having a same decreasing extent; and a generation module 1504, configured to generate a target image corresponding to the target region according to the second location information of the at least one target contour and the target region information, the target image including a contour located in the target region.

According to the image generation apparatus provided in the embodiments of the disclosure, the target region is defined so that the computer device only needs to generate the target image corresponding to the target region and does not need to generate images corresponding to other regions. According to the disclosure, the coordinates of the plurality of contour points on the target contour are decreased to achieve the effect of cutting off the images corresponding to other regions, thereby reducing the size of the target image. In addition, the coordinates of the plurality of contour points on the target contour in the disclosure have the same decreasing extent, so that a distance between contours in the target image is the same as a distance between corresponding contours in the original image, thereby avoiding the problem of contour adhesion, and ensuring the accuracy of the generated target image.

Figure 16:
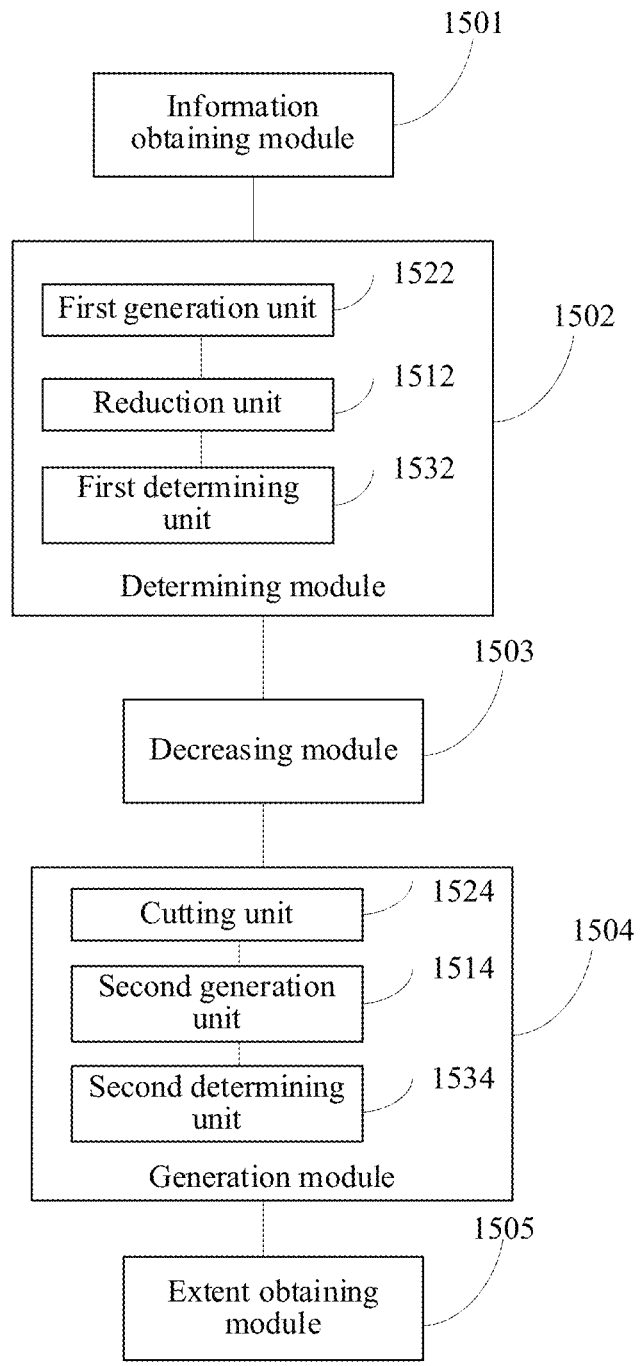
FIG. 16 is a schematic structural diagram of another image generation apparatus according to an embodiment of the disclosure.

As shown in FIG. 16, in an example embodiment, the first coordinates include horizontal coordinates and vertical coordinates, and the apparatus further includes:

an extent obtaining module 1505, configured to: obtain a first minimum horizontal coordinate and a first minimum vertical coordinate according to first location information of the at least one target contour; determine the first minimum horizontal coordinate as a decreasing extent of horizontal coordinates of the plurality of contour points in the at least one target contour; and determine the first minimum vertical coordinate as a decreasing extent of vertical coordinates of the plurality of contour points in the at least one target contour.

In an example embodiment, the first coordinates include horizontal coordinates and vertical coordinates, and the extent obtaining module 1505 is further configured to: obtain a second minimum horizontal coordinate and a second minimum vertical coordinate of the target region according to the target region information; determine the second minimum horizontal coordinate as a decreasing extent of horizontal coordinates of the plurality of contour points in the at least one target contour; and determine the second minimum vertical coordinate as a decreasing extent of vertical coordinates of the plurality of contour points in the at least one target contour.

In an example embodiment, the determining module 1502 is further configured to determine, in response to determining that any contour point is located in the target region according to the contour information and the target region information, an original contour to which the any contour point belongs as a target contour.

In an example embodiment, as shown in FIG. 16, the determining module 1502 includes:

a reduction unit 1512, configured to reduce the first location information of the at least one original contour to obtain third location information of at least one first contour, any first contour being a contour after a corresponding original contour is reduced, and the first location information of the at least one original contour having a same reduction ratio;

a first generation unit 1522, configured to generate a first image corresponding to the original image according to the third location information of the at least one first contour, the first image including the at least one first contour, the reduction unit 1512 being further configured to reduce the target region information to obtain first region information, the first region information indicating the reduced target region, and a reduction ratio of the target region information being equal to the reduction ratio of the first location information of the at least one original contour; and a first determining unit 1532, configured to determine the at least one target contour according to the first region information and the first image.

In an example embodiment, the contour information further includes a contour identifier of the at least one original contour; and the first generation unit 1522 is configured to generate the first image according to the third location information of the at least one first contour and the contour identifier of the at least one original contour, the first image including the at least one first contour and a contour identifier of the at least one first contour, and a contour identifier of any first contour being a contour identifier of an original contour corresponding to the any first contour.

In an example embodiment, the first determining unit 1532 is configured to: determine a contour identifier of at least one second contour according to the at least one first contour in the first image, the contour identifier of the at least one first contour, and the first region information, the at least one second contour being a first contour that is wholly or partly located in the reduced target region in the first image; and determine an original contour corresponding to the at least one second contour as a target contour according to the contour identifier of the at least one second contour.

In an example embodiment, the first generation unit 1522 is configured to set a pixel value in a contour region corresponding to any first contour as the contour identifier of the any first contour; and generate the first image according to the third location information of the at least one first contour and a pixel value in a contour region corresponding to the at least one first contour.

In an example embodiment, as shown in FIG. 16, the generation module 1504 includes:

a second generation unit 1514, configured to generate a third image according to the second location information of the at least one target contour, the third image including the at least one target contour; and a cutting unit 1524, configured to cut the target region in the third image according to the target region information, to obtain the target image corresponding to the target region.

In an example embodiment, as shown in FIG. 16, the generation module 1504 includes:

a second determining unit 1534, configured to determine contour points located in the target region in the at least one target contour according to second coordinates of the plurality of contour points in the at least one target contour and the target region information, the second generation unit 1514 being further configured to generate the target image according to second coordinates of the contour points located in the target region in the at least one target contour and the target region information.

Figure 17:
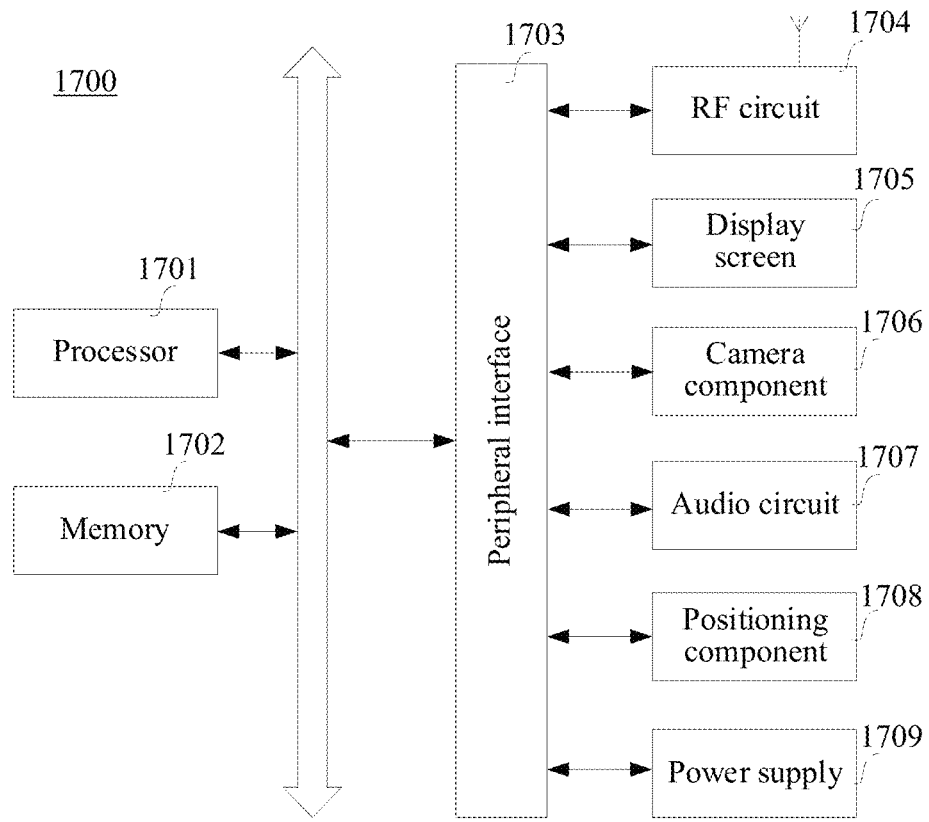
FIG. 17 is a structural block diagram of a terminal according to an embodiment of the disclosure.

FIG. 17 is a structural block diagram of a terminal according to an embodiment of the disclosure. The terminal 1700 is configured to perform the operations performed by the terminal or the smart device in the foregoing embodiments. For example, the terminal 1700 is a portable mobile terminal. The terminal 1700 may also be referred to as user equipment, a portable terminal, a laptop terminal, a desktop terminal, or the like.

Generally, the terminal 1700 includes a processor 1701 and a memory 1702.

The processor 1701 includes one or more processing cores, for example, a 4-core processor or an 8-core processor. The memory 1702 includes one or more computer-readable storage media. For example, the computer-readable storage medium is non-transient. In some embodiments, a non-transitory computer-readable storage medium in the memory 1702 is configured to store at least one instruction, the at least one instruction being configured to be executed by the processor 1701 to implement the image generation method provided in the method embodiments of the disclosure.

In some embodiments, the terminal 1700 may include a peripheral interface 1703 and at least one peripheral. The processor 1701, the memory 1702, and the peripheral interface 1703 may be connected by a bus or a signal cable. Each peripheral may be connected to the peripheral interface 1703 by a bus, a signal cable, or a circuit board. For example, the peripheral includes at least one of a radio frequency (RF) circuit 1704, a display screen 1705, a camera component 1706, an audio circuit 1707, a positioning component 1708, or a power supply 1709.

The peripheral interface 1703 may be configured to connect at least one peripheral related to input/output (I/O) to the processor 1701 and the memory 1702. The RF circuit 1704 is configured to receive and transmit an RF signal, also referred to as an electromagnetic signal. The display screen 1705 is configured to display a user interface (UI). The camera component 1706 is configured to acquire an image or a video. The audio circuit 1707 includes a microphone and a speaker. The microphone is configured to acquire sound waves of users and surroundings, and convert the sound waves into electrical signals and input the signals to the processor 1701 for processing, or input the signals to the RF circuit 1704 to implement voice communication. The speaker is configured to convert electric signals from the processor 1701 or the RF circuit 1704 into sound waves. The positioning component 1708 is configured to determine a current geographic location of the terminal 1700, to implement navigation or a location-based service (LBS). The power supply 1709 is configured to supply power to assemblies in the terminal 1700.

A person skilled in the art can understand that the structure shown in FIG. 17 does not constitute a limitation to the terminal 1700, and the terminal 1700 may include more or fewer components than those shown in the figure, or some components may be combined, or a different component arrangement may be used.

Figure 18:
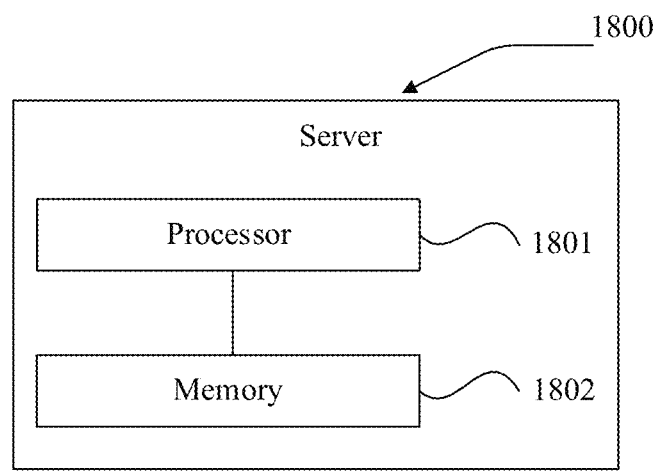
FIG. 18 is a schematic structural diagram of a server according to an embodiment of disclosure.

FIG. 18 is a schematic structural diagram of a server according to an embodiment of the disclosure. The server 1800 may vary greatly due to different configurations or performance, and may include one or more central processing units (CPUs) 1801 and one or more memories 1802. The memory 1802 stores at least one instruction, the at least one instruction being loaded and executed by the processor 1801 to implement the image generation method provided in the foregoing method embodiments. Certainly, the server 1800 may further have a wired or wireless network interface, a keyboard, an input/output interface and other components to facilitate input/output. The server 1800 may further include other components for implementing device functions. Details are not described herein. The server 1800 may be configured to perform the operations performed by the server in the foregoing image generation method.

An embodiment of the disclosure further provides a computer device, including a processor and a memory, the memory storing at least one instruction, the at least one instruction being loaded and executed by the processor to perform the operations performed in the image generation method according to the foregoing embodiments.

An embodiment of the disclosure further provides a non-transitory computer-readable storage medium, storing at least one instruction, the at least one instruction being loaded and executed by a processor to perform the operations performed in the image generation method according to the foregoing embodiments.

An embodiment of the disclosure further provides a computer program or a computer program product, the computer program or the computer program product storing at least one instruction, the at least one instruction being loaded and executed by a processor to perform the operations performed in the image generation method according to the foregoing embodiments.

A person of ordinary skill in the art may understand that all or some of the operations of the foregoing embodiments may be implemented by hardware, or may be implemented by a program instructing related hardware. The program may be stored in a non-transitory computer-readable storage medium. The non-transitory computer-readable storage medium is a read-only memory (ROM), a magnetic disk, or an optical disc.

The foregoing descriptions are merely optional embodiments of the disclosure, but are not intended to limit the disclosure. Any modification, equivalent replacement, or improvement made within the spirit and principle the disclosure shall fall within the protection scope of the disclosure.

What is claimed is:

1. An image generation method, performed by a computer device, the method comprising:
   obtaining contour information and target region information, the contour information comprising first location information of at least one original contour in an original image, first location information of the at least one original contour comprising first coordinates of a plurality of contour points in the at least one original contour, and the target region information indicating a target region in the original image;
   determining at least one target contour according to the contour information and the target region information, the at least one target contour being wholly or partly located in the target region;
   decreasing first coordinates of a plurality of contour points in the at least one target contour to obtain second location information of the at least one target contour, second location information of the at least one target contour comprising second coordinates of a plurality of contour points in the at least one target contour, and the first coordinates of the plurality of contour points in the at least one target contour having a same decreasing extent such that a relative position relationship between the at least one target contour in a target image according to the second location information is the same as a relative position relationship between corresponding at least one target contour in the original image; and
   generating the target image corresponding to the target region according to the second location information of the at least one target contour and the target region information, the target image comprising a contour located in the target region.

2. The image generation method according to claim 1, wherein the first coordinates comprise horizontal coordinates and vertical coordinates; and before the decreasing, the method further comprises:
   obtaining a first minimum horizontal coordinate and a first minimum vertical coordinate according to first location information of the at least one target contour;
   determining the first minimum horizontal coordinate as a decreasing extent of horizontal coordinates of the plurality of contour points in the at least one target contour; and
   determining the first minimum vertical coordinate as a decreasing extent of vertical coordinates of the plurality of contour points in the at least one target contour.

3. The image generation method according to claim 1, wherein the first coordinates comprise horizontal coordinates and vertical coordinates; and
   wherein the method further comprises:
   obtaining a second minimum horizontal coordinate and a second minimum vertical coordinate of the target region according to the target region information;

determining the second minimum horizontal coordinate as a decreasing extent of horizontal coordinates of the plurality of contour points in the at least one target contour; and determining the second minimum vertical coordinate as a decreasing extent of vertical coordinates of the plurality of contour points in the at least one target contour.

4. The image generation method according to claim 1, wherein the determining comprises:

determining, in response to determining that any one of the plurality of contour points is located in the target region according to the contour information and the target region information, an original contour to which the any one of the plurality of contour points belongs as a target contour.

5. The image generation method according to claim 1, wherein the determining comprises:

reducing the first location information of the at least one original contour to obtain third location information of at least one first contour, the at least one first contour being a contour after a corresponding original contour is reduced, and the first location information of the at least one original contour having a same reduction ratio;

generating a first image corresponding to the original image according to the third location information of the at least one first contour, the first image comprising the at least one first contour;

reducing the target region information to obtain first region information, the first region information indicating the reduced target region, and a reduction ratio of the target region information being equal to the reduction ratio of the first location information of the at least one original contour; and determining the at least one target contour according to the first region information and the first image.

6. The image generation method according to claim 5, wherein the contour information further comprises a contour identifier of the at least one original contour; and the generating a first image corresponding to the original image according to the third location information of the at least one first contour comprises:

generating the first image according to the third location information of the at least one first contour and the contour identifier of the at least one original contour, the first image comprising the at least one first contour and a contour identifier of the at least one first contour, and a contour identifier of the at least one first contour being a contour identifier of an original contour corresponding to the at least one first contour.

7. The image generation method according to claim 6, wherein the determining the at least one target contour according to the first region information and the first image comprises:

determining a contour identifier of at least one second contour according to the at least one first contour in the first image, the contour identifier of the at least one first contour, and the first region information, the at least one second contour being a first contour that is wholly or partly located in the reduced target region in the first image; and determining an original contour corresponding to the at least one second contour as a target contour according to the contour identifier of the at least one second contour.

8. The image generation method according to claim 6, wherein the generating the first image according to the third location information of the at least one first contour and the contour identifier of the at least one original contour comprises:

setting a pixel value in a contour region corresponding to the at least one first contour as the contour identifier of the at least one first contour; and generating the first image according to the third location information of the at least one first contour and a pixel value in a contour region corresponding to the at least one first contour.

9. The image generation method according to claim 1, wherein the generating comprises:

generating a third image according to the second location information of the at least one target contour, the third image comprising the at least one target contour; and cutting the target region in the third image according to the target region information to obtain the target image corresponding to the target region.

10. The image generation method according to claim 1, wherein the generating comprises:

determining contour points located in the target region in the at least one target contour according to second coordinates of the plurality of contour points in the at least one target contour and the target region information; and generating the target image according to second coordinates of the contour points located in the target region in the at least one target contour and the target region information.

11. An image generation apparatus, comprising:

at least one memory configured to store program code; and at least one processor configured to read the program code and operate as instructed by the program code, the program code comprising:

information obtaining code configured to cause the at least one processor to obtain contour information and target region information, the contour information comprising first location information of at least one original contour in an original image, first location information of the at least one original contour comprising first coordinates of a plurality of contour points in the at least one original contour, and the target region information indicating a target region in the original image;

determining code configured to cause the at least one processor to determine at least one target contour according to the contour information and the target region information, the at least one target contour being wholly or partly located in the target region;

decreasing code configured to cause the at least one processor to decrease first coordinates of a plurality of contour points in the at least one target contour to obtain second location information of the at least one target contour, second location information of the at least one target contour comprising second coordinates of a plurality of contour points in the at least one target contour, and the first coordinates of the plurality of contour points in the at least one target contour having a same decreasing extent such that a relative position relationship between the at least one target contour in a target image according to the second location information is the same as a relative position relationship between corresponding at least one target contour in the original image; and generating code configured to cause the at least one processor to generate the target image corresponding to the target region according to the second location information of the at least one target contour and the target region information, the target image comprising a contour located in the target region.

12. The image generation apparatus according to claim 11, wherein the first coordinates comprise horizontal coordinates and vertical coordinates; and the program code further comprises extent obtaining code configured to cause the at least one processor to:
obtain a first minimum horizontal coordinate and a first minimum vertical coordinate according to first location information of the at least one target contour;
determine the first minimum horizontal coordinate as a decreasing extent of horizontal coordinates of the plurality of contour points in the at least one target contour; and
determine the first minimum vertical coordinate as a decreasing extent of vertical coordinates of the plurality of contour points in the at least one target contour.

13. The image generation apparatus according to claim 12, wherein the extent obtaining module is further configured to cause the at least one processor to:
obtain a second minimum horizontal coordinate and a second minimum vertical coordinate of the target region according to the target region information;
determine the second minimum horizontal coordinate as a decreasing extent of horizontal coordinates of the plurality of contour points in the at least one target contour; and
determine the second minimum vertical coordinate as a decreasing extent of vertical coordinates of the plurality of contour points in the at least one target contour.

14. The image generation apparatus according to claim 11, wherein the determining code is further configured to cause the at least one processor to:
determine, based on determining that any one of the plurality of contour points is located in the target region according to the contour information and the target region information, an original contour to which the any one of the plurality of contour points belongs as a target contour.

15. The image generation apparatus according to claim 11, wherein the determining code comprises:
reduction code configured to cause the at least one processor to reduce the first location information of the at least one original contour to obtain third location information of at least one first contour, the at least one first contour being a contour after a corresponding original contour is reduced, and the first location information of the at least one original contour having a same reduction ratio;
first generation code configured to cause the at least one processor to generate a first image corresponding to the original image according to the third location information of the at least one first contour, the first image comprising the at least one first contour,
the reduction code is further configured to cause the at least one processor to reduce the target region information to obtain first region information, the first region information indicating the reduced target region, and a reduction ratio of the target region information being equal to the reduction ratio of the first location information of the at least one original contour; and
first determining code configured to cause the at least one processor to determine the at least one target contour according to the first region information and the first image.

16. The image generation apparatus according to claim 15, wherein the contour information further comprises a contour identifier of the at least one original contour; and first generation code is further configured to cause the at least one processor to:
generate the first image according to the third location information of the at least one first contour and the contour identifier of the at least one original contour, the first image comprising the at least one first contour and a contour identifier of the at least one first contour, and a contour identifier of the at least one first contour being a contour identifier of an original contour corresponding to the at least one first contour.

17. The image generation apparatus according to claim 16, wherein the first determining code is further configured to cause the at least one processor:
determine a contour identifier of at least one second contour according to the at least one first contour in the first image, the contour identifier of the at least one first contour, and the first region information, the at least one second contour being a first contour that is wholly or partly located in the reduced target region in the first image; and
determine an original contour corresponding to the at least one second contour as a target contour according to the contour identifier of the at least one second contour.

18. The image generation apparatus according to claim 16, wherein the first generation code is further configured to cause the at least one processor to:
set a pixel value in a contour region corresponding to the at least one first contour as the contour identifier of the at least one first contour; and
generate the first image according to the third location information of the at least one first contour and a pixel value in a contour region corresponding to the at least one first contour.

19. The image generation apparatus according to claim 11, wherein the generation code further comprises:
second generation code configured to cause the at least one processor to generate a third image according to the second location information of the at least one target contour, the third image comprising the at least one target contour; and
cutting code configured to cause the at least one processor to cut the target region in the third image according to the target region information to obtain the target image corresponding to the target region.

20. A non-transitory computer-readable storage medium, storing a computer program that when executed by at least one processor causes the at least one processor to:
obtain contour information and target region information, the contour information comprising first location information of at least one original contour in an original image, first location information of the at least one original contour comprising first coordinates of a plurality of contour points in the at least one original contour, and the target region information indicating a target region in the original image;
determine at least one target contour according to the contour information and the target region information, the at least one target contour being wholly or partly located in the target region;
decrease first coordinates of a plurality of contour points in the at least one target contour to obtain second location information of the at least one target contour, second location information of the at least one target contour comprising second coordinates of a plurality of contour points in the at least one target contour, and the first coordinates of the plurality of contour points in the at least one target contour having a same decreasing extent such that a relative position relationship between the at least one target contour in a target image according to the second location information is the same as a relative position relationship between corresponding at least one target contour in the original image; and generate the target image corresponding to the target region according to the second location information of the at least one target contour and the target region information, the target image comprising a contour located in the target region.

* * * * *